United States Patent
Higashino et al.

[11] Patent Number: 6,105,456
[45] Date of Patent: Aug. 22, 2000

[54] STEERING INTERMEDIATE SHAFT

[75] Inventors: Kiyoharu Higashino, Gunma-ken; Sakae Matsumoto, Takasaki; Shinichi Fuchigami, Maebashi; Shoji Oka, Gunma-ken, all of Japan

[73] Assignee: NSK Ltd., Tokyo, Japan

[21] Appl. No.: 09/090,979

[22] Filed: Jun. 5, 1998

[30] Foreign Application Priority Data

| Jun. 12, 1997 | [JP] | Japan | 9-155312 |
| Jul. 4, 1997 | [JP] | Japan | 9-193351 |
| Aug. 8, 1997 | [JP] | Japan | 9-215124 |

[51] Int. Cl.⁷ .............................. F16D 3/38; B62D 1/16
[52] U.S. Cl. .............................. 74/492; 464/113; 464/162
[58] Field of Search ..................... 403/329, 327; 464/113, 162, 179, 182, 183; 74/492, 493; 280/777, 775

[56] References Cited

U.S. PATENT DOCUMENTS

| 4,106,311 | 8/1978 | Euler | 74/492 |
| 4,329,078 | 5/1982 | Crates et al. | 403/316 |
| 4,509,775 | 4/1985 | Arndt | 280/779 |
| 4,911,034 | 3/1990 | Kulczyk et al. | 74/492 |
| 5,417,614 | 5/1995 | Dykema et al. | 464/162 |
| 5,560,257 | 10/1996 | DeBisschop et al. | 74/492 |
| 5,823,703 | 10/1998 | Thomas et al. | 74/492 |

FOREIGN PATENT DOCUMENTS

| 2 747 746 | 10/1997 | France . |
| 57-51564 | 11/1982 | Japan . |
| 63-17862 | 5/1988 | Japan . |
| 7-257398 | 10/1995 | Japan . |
| 2 205 149 | 11/1988 | United Kingdom . |
| 2 309 284 | 7/1997 | United Kingdom . |

*Primary Examiner*—David M. Fenstermacher
*Attorney, Agent, or Firm*—Vorys, Sater, Seymour & Pease, LLP

[57] ABSTRACT

A steering intermediate shaft has an inner shaft member and an outer tube member so engaged with each other as to be capable of transmitting rotation and to be slidable in an axial direction. The outer tube member includes slits so formed at one end as to extend in the axial direction. An annular fastening member is provided at a portion of the outer tube member formed with the slits to exert a fastening action inwards in a radial direction. The fastening member includes a disengagement preventing member for preventing the outer tube member from disengaging from the inner shaft member against an axial force within a predetermined value by engaging with the inner shaft member.

16 Claims, 22 Drawing Sheets

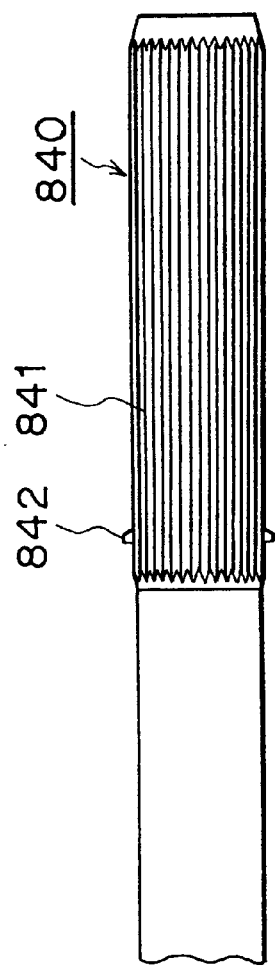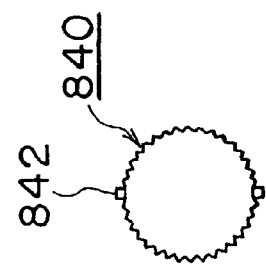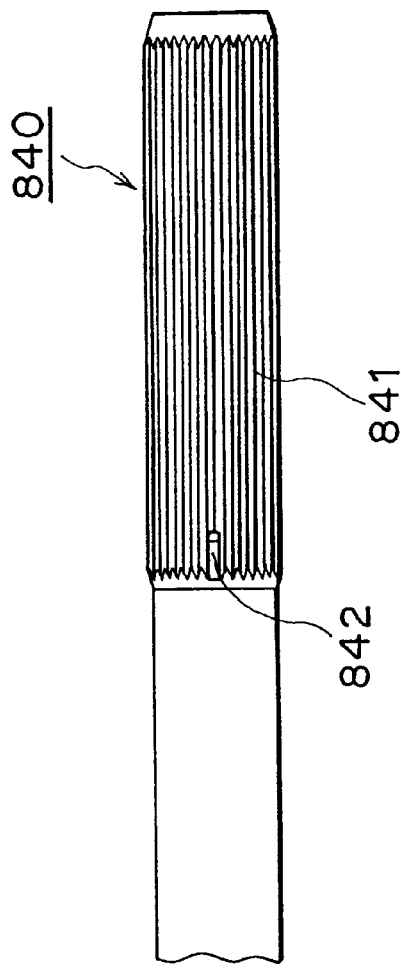

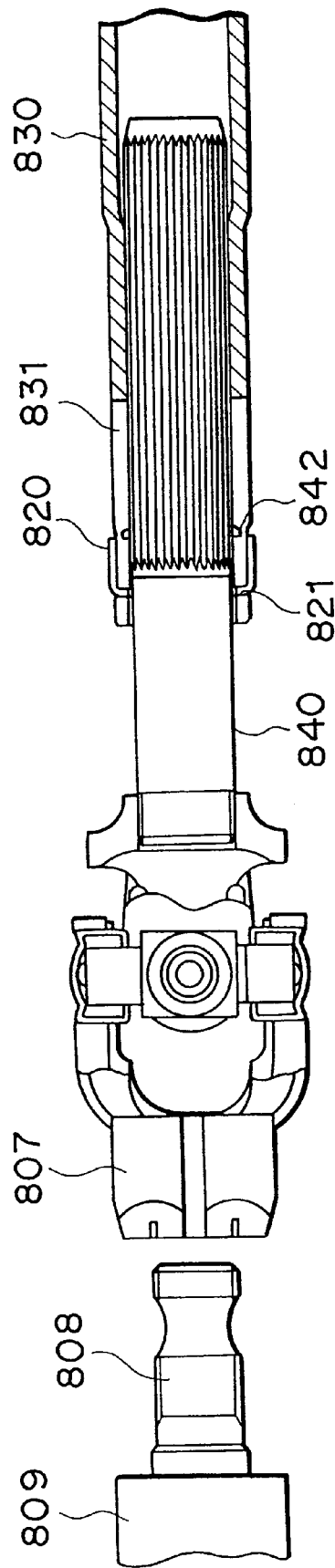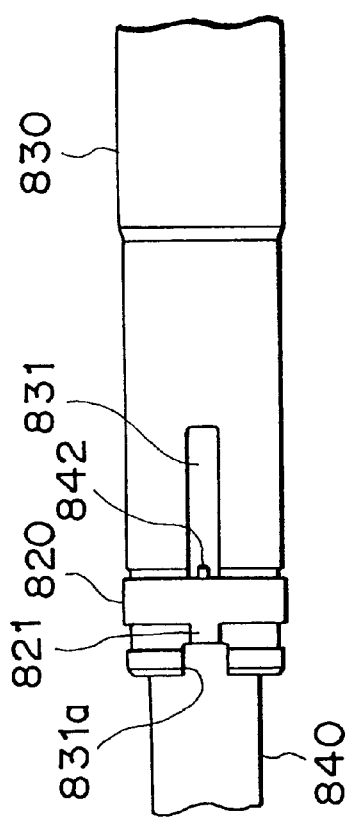
FIG. 21A
FIG. 21B

STEERING INTERMEDIATE SHAFT

This application claims the benefit of Japanese Patent Applications Nos. 9-155312, 9-193351 and 9-215124 which are hereby incorporated by reference.

BACKGROUND OF THE INVENTION

1. Field of the Invention

The present invention relates to an expandable/contractible intermediate shaft used in a steering apparatus of, e.g., an automobile, in which an entire length thereof diminishes in the event of a collision accident, thereby preventing a steering wheel from thrusting a driver's body up.

2. Related Background Art

It has hitherto been widely practiced that an expandable/contractible intermediate shaft is provided midway of a steering apparatus in order to prevent a steering wheel from thrusting a driver's body up in the event of a collision accident. This expandable/contractible intermediate shaft diminishes an entire length if a front portion of the automobile is crashed subsequent to a so-called primary impact in which the automobile collides with other automobile. Such an expandable/contractible intermediate shaft is constructed by making a serration or spline engagement between one end of an outer tube member and one end of a solid inner shaft member. Further, as disclosed in Japanese Utility Model Post-Exam Publication No. 63-17862, there has hitherto been known a structure for causing no backlash in the engaging portions between one end of the outer tube member and one end of the inner shaft member.

FIG. 29 shows an expandable/contractible intermediate shaft disclosed in this publication. An inner peripheral surface of an outer tube member P1 is formed with a female spline P2, and an outer peripheral surface of a solid inner shaft member P3 is formed with a male spline P4 engaging with the female spline P2. Further, slits P5, P5 each opening at one edge of the outer tube member P1 are formed in a plurality of positions in a circumferential direction of one end of the outer tube member P1. Moreover, a ring-like fastening member P6 is externally fitted to one end of the outer tube member P1. This ring-like fastening member P6 elastically fastens an inner peripheral surface of one end of the outer tube member P1 onto the outer peripheral surface of the solid inner shaft member in a state where the inner shaft member P3 is inserted into the outer tube member P1. Then, a backlash in engaging portions between the female and male splines P2, P4 is thereby prevented irrespective of a minute gap existing between the female spline P2 and the male spline P4.

The conventional structure shown in FIG. 29 is capable of preventing the backlash in the engaging portions between the female and male splines P2, P4. An operation of preventing the inner shaft member P3 from disengaging from the outer tube member P1 before assembling the expandable/contractible intermediate shaft to the steering apparatus, is, however, incomplete. Hence, there might be a possibility that the inner shaft member P3 disengages from the outer tube member P1 when a worker holds and lifts only one of the inner shaft member P3 and the outer tube member P1 by a hand and so on in the course of being carried from a manufacturing factory of the expandable/contractible intermediate shaft to an automobile assembly factory or during an assembling operation in the assembly factory.

In the case of being used as an intermediate shaft constituting the steering apparatus of the automobile, first and second universal joints of a joint cross type for connecting a steering shaft or an input shaft of a steering gear, are attached to portions at both ends. Phases of the pair of first and second universal joints enable the intermediate shaft fitted with these two universal joints to be installed in a limited space, or offset non-constant velocities possessed by the individual joint cross type universal joints. Therefore, the assembly is performed in the manufacturing factory of the expandable/contractible intermediate shaft in a state of giving a predetermined phase difference in the rotating direction. Accordingly, after the inner shaft member P3 has disengaged once from the outer tube member P1, even when the worker properly inserts the inner shaft member P3 into the outer tube member P1, the intermediate shaft can not be fitted, and, even if could be fitted, there must be a deviation in relationship between an operating angle of the steering wheel and a steering angle given to a front wheel, with the result that the non-constant velocity becomes conspicuous.

An expandable/contractible intermediate shaft of the present invention is invented, for the purpose of obviating the problems described above, to actualize a structure in which the inner shaft member P3 never disengages from the outer tube member P1 except when required before being assembled to a steering apparatus such as when carried and when in the assembling process and so forth.

Incidentally, another problem is that, if the disengagement occurs, phases of the first universal joint connected to the inner shaft member and of the second universal joint connected to the outer tube member come to be unknown with the result that it must be time-consuming to make the phases coincident, or the torque largely fluctuates in the actual vehicle due to an out-of-phase mis-insertion.

SUMMARY OF THE INVENTION

Accordingly, it is an object of the present invention to provide an intermediate shaft having a spline joining structure contrived to prevent an inner shaft member from disengaging from an outer tube member.

An expandable/contractible intermediate shaft according to the present invention includes an outer tube member, an inner shaft member, slits and an annular fastening member. The outer tube member among these components is formed with a female serration or a female spline along at least an inner peripheral surface of one end thereof. Further, at least an outer peripheral surface of one end of the inner shaft member, which is inserted into one end of the outer tube member, is formed with a male serration engaging with the female serration, or a male spline engaging with the female spline. Further, the slits are formed in a plurality of positions of one end of the outer tube member in a circumferential direction, and each have an aperture at one edge of the outer tube member. Moreover, the fastening member is externally fitted to one end of the outer tube member and elastically fastens the inner peripheral surface of one end thereof onto the outer peripheral surface of the inner shaft member.

According to one aspect of the present invention, an intermediate shaft has a spline joining structure which follows. An outer tube member includes slits formed in an axial direction at its edge and an inner spline formed inwardly of the edge thereof. A solid inner shaft member having an outer spline formed on an outer portion of the edge thereof is inserted into the outer tube member, thus effecting a spline junction of the outer tube member to the inner shaft member. Then, a fastening member fastens an outer portion of the end of the outer tube member, thereby closely fitting the outer spline to the inner spline. This intermediate shaft includes a disengagement preventing member, interposed between the fastening member and the inner shaft member, for engaging simultaneously with the fastening member and a part of the inner shaft member to become a resistance in a disengaging direction against an axial relative disengaging motion of the inner shaft member out of the outer tube member, and thereby hindering a further disengaging motion.

In particular, the expandable/contractible intermediate shaft may be provided with an extended arm extending from a part of the fastening member toward an intermediate portion of the inner shaft member and protruding from one end of the outer tube member. Then, the tip of this extended arm engages with the outer peripheral surface of the intermediate portion of the inner shaft member, thereby preventing the inner shaft member from disengaging from the outer tube member except when required.

The disengagement preventing means may include an engaging member supported by the outer tube member, which engages with the outer periphery of the inner shaft member through one of the slits to prevent the disengagement between the inner shaft member and the outer tube member.

In the case of the thus constructed expandable/contractible intermediate shaft according to one aspect of the present invention, the inner shaft member does not disengage from the outer tube member except when required, and it is therefore feasible to prevent inconveniences such as an assembling incapability and an occurrence of extreme non-constant velocity, which are caused subsequent to the disengagement of the inner shaft member from the outer tube member.

As described above, the slits are formed in the end portion, on the side of the inner shaft member, of the outer tube member, and the fastening member for fastening the outer tube member inward is fitted in the vicinity of the above end portion, whereby a backlash in the rotating direction between the outer tube member and the inner shaft member can be reduced. Because of being fastened by the fastening member, however, there also increases a frictional force in the axial direction between the outer tube member and the inner shaft member. A sliding force needed for inserting and pulling the inner shaft member when in the assembling process described above, is thereby increased. This might result in a difficulty of alignment (adjustments in the axial direction and in a serration angle phase) between a joint of a joint cross of the output-side shaft member, a yoke and a joint of a joint cross of the input-side shaft member, which leads to a poor operability.

According to a second aspect of the present invention which obviates the problem described above, an intermediate shaft is constructed to make possible a relative displacement in the axial direction between the inner shaft member and the outer tube member by a small sliding force when in the assembling process and to, when completed, provide a tight engagement with no backlash in the rotating direction between the inner shaft member and the outer tube member.

A steering intermediate shaft according to the second aspect of the present invention for obviating the above problem includes an outer tube member and an inner shaft member which are slidable in the axial direction through a spline engagement or a serration engagement. The outer tube member is formed with at least one slit in the axial direction. In this construction, a fastening member for fastening the outer tube member inward in a radial direction is provided on an outer periphery of the outer tube member in an axial position where the slit is formed. A fastening force of the fastening member is variable corresponding to the axial position of the inner shaft member. With this arrangement, when in the assembling process, the axial sliding between the inner shaft member and the outer tube member is facilitated by decreasing the fastening force, and, after the assembly has been completed, there can be produced the fastening force strong enough to transmit the rotating force with no backlash between the inner shaft member and the outer tube member.

In one embodiment of the steering intermediate shaft according to the second aspect of the present invention, the fastening member is provided with at least one protruded portion fitted in the slit formed in the outer tube member. A width of the protruded portion is set slightly larger than a width of the slit, and the protruded portion is fitted in the slit to expand the slit when the fastening member is attached to the outer surface of the outer tube member. In this state, an inside diameter of the outer tube member is thereby increased, and the inner shaft member becomes easily slidable in the axial direction within the outer tube member.

Further, when the width of the slit of the outer tube member is changed corresponding to the axial position of the outer tube member, the fastening member is moved in the axial direction in a state where the protruded portion of the fastening member is fitted in the slit, thereby making variable a degree to which the protruded portion expands the slit of the outer tube member. Namely, it is feasible to change the sliding force when the inner shaft member moves in the axial direction within the outer tube member in accordance with the axial position of the fastening member. Preferably, the slit width is made larger stepwise than the width of the protruded portion of the fastening member in the vicinity of the end portion, on the side of the inner shaft member, of the outer tube member. In this case, the protruded portion escapes in a portion with an increased slit width by moving the fastening member toward the inner shaft member, and is thereby released from the state of expanding the slit, and the fastening member is allowed to make the fastening force act upon the outer tube member.

In addition to this stepwise slit structure, the intermediate shaft can be also constructed such that the outer surface of the inner shaft member is provided with a projection projecting into the slit of the outer tube member when the inner shaft member is inserted into the outer tube member, and the projection of the inner shaft member moves the fastening member by pushing when the inner shaft member is pulled out of the outer tube member when the steering mechanism is assembled. With this construction, just when the inner shaft member is pulled to a certain axial position out of the outer tube member, the protruded portion of the fastening member escapes in a large-width portion of the slit and is thus released from the state of expanding the slit, thereby enabling the fastening member to fasten the outer tube member.

In a second embodiment according to the second aspect of the present invention, the fastening member is formed by rounding a narrow and thin elastic member into an annular shape, in which case two end portions of the elastic member are overlapped with each other in a peripheral direction of the ring, and bent portions are formed by bending inward respectively the overlapped portions of the two end portions. As in the case described above, the slit width is so set as to have a relatively large width portion in the vicinity of the end portion and a relatively small width portion other than the former, and an outer dimension of the bent portion is set larger than the small width portion of the slit. Then, the fastening member is attached to the outer tube member in a state where the bent portion is initially fitted to the small width portion of the slit. At this time, the bent portion of the slit is shrunk by pushing, and, as a result, the inside diameter of the ring of the fastening member increases. Therefore, the fastening force of the fastening member does not act. The axial position of the inner shaft member with respect to the outer tube member is shifted in a direction of disengagement out of the outer tube member, whereby the projection pushes and moves the bent portion of the fastening member as done in the above case and the bent portion is squeezed into the large width portion of the slit. This enables the fastening force of the fastening member to act.

BRIEF DESCRIPTION OF THE DRAWINGS

FIGS. 20A–20C are a front view, a side view and a plan view each showing an inner shaft member of the steering intermediate shaft in the seventh embodiment of the present invention;

FIGS. 21A and 21B a front view and a plan view each showing a state before being joined to a steering gear by combining respective members of the steering intermediate shaft in the seventh embodiment;

DESCRIPTION OF THE PREFERRED EMBODIMENTS

Figure 1:
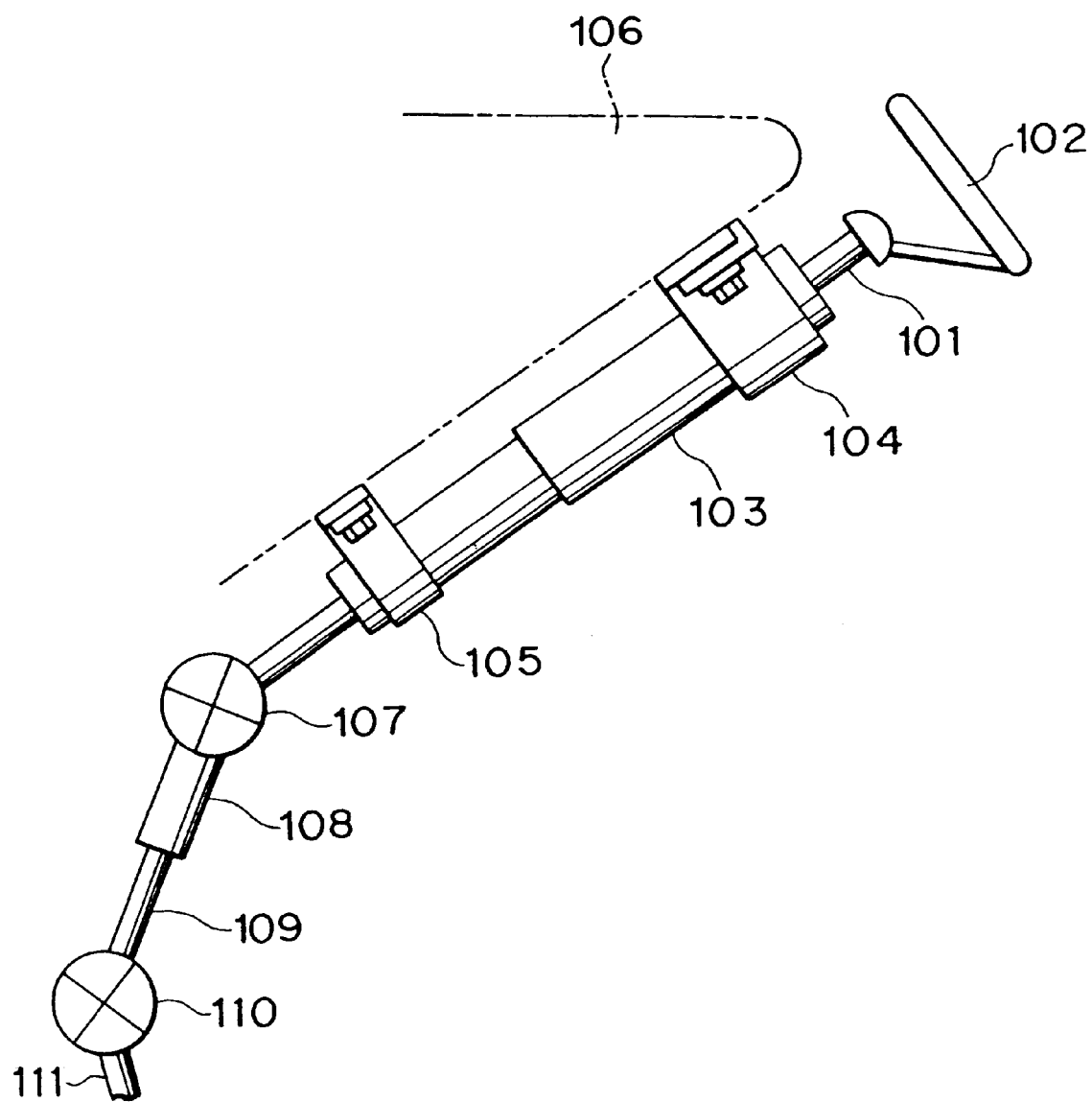
FIG. 1 is a view schematically showing a steering apparatus for an automobile, which incorporates an expandable/contractible intermediate shaft according to the present invention.
Figure 2:
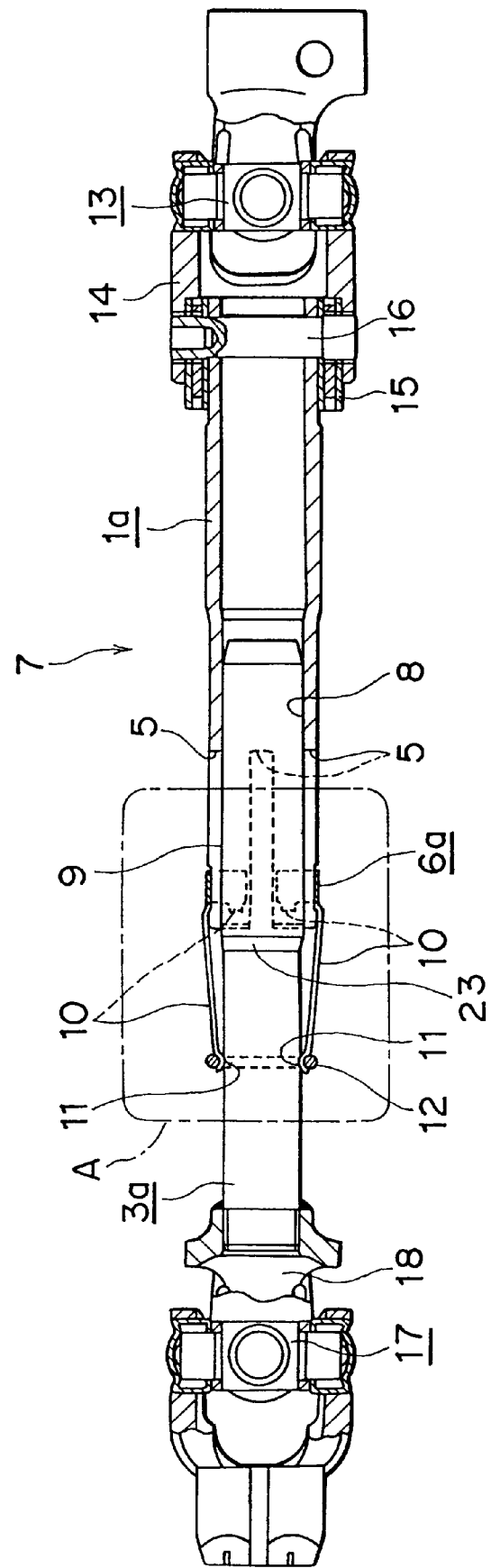
FIG. 2 is a sectional view showing a first embodiment of the present invention.
Figure 3:
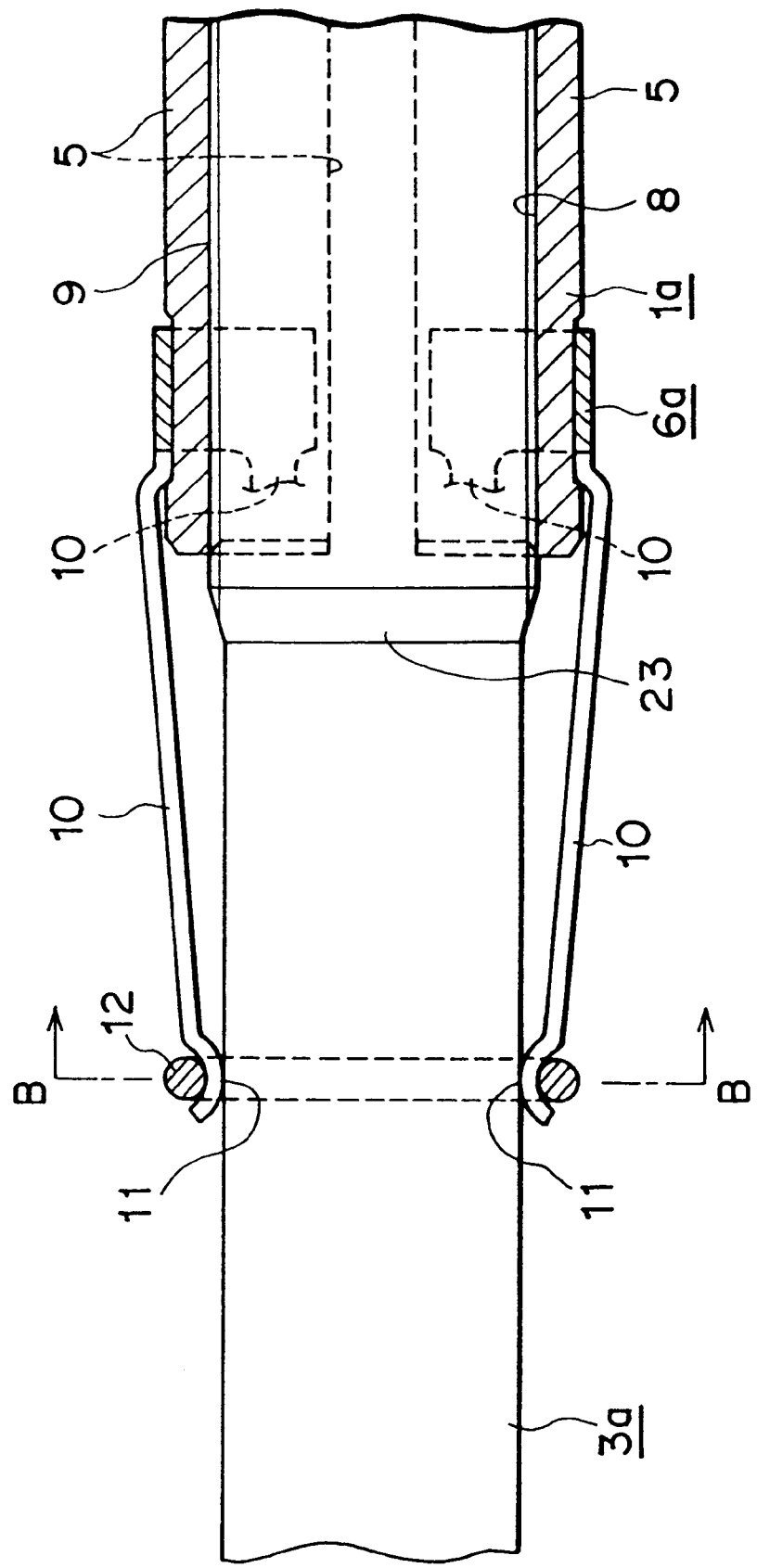
FIG. 3 is an enlarged view showing a portion A in FIG. 2.
Figure 4:
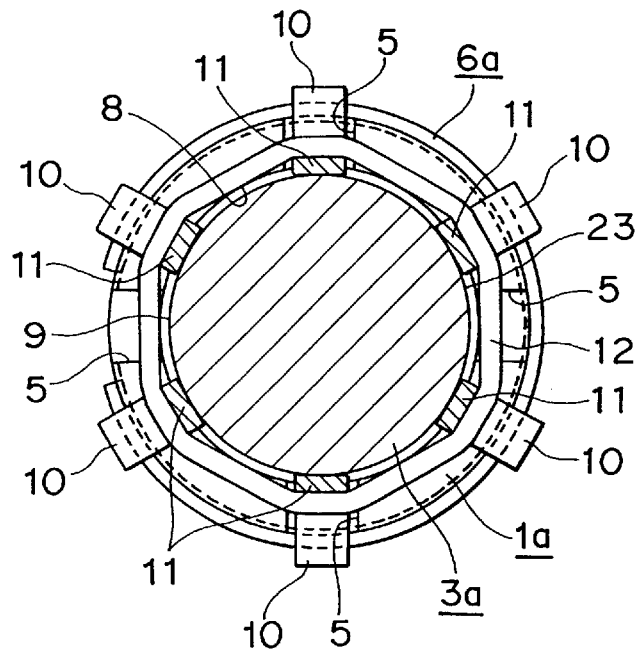
FIG. 4 is a sectional view taken substantially along the line B—B in FIG. 3.
Figure 5:
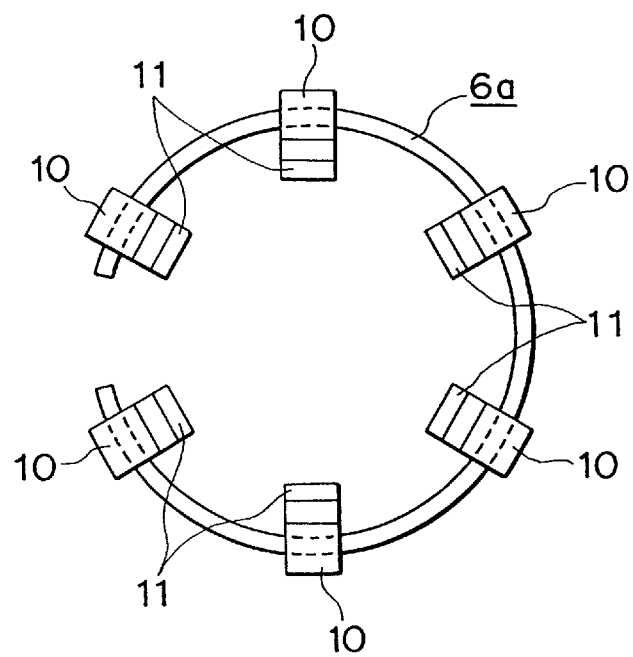
FIG. 5 is a view as viewed from leftward in FIG. 3 by taking out a fastening member including an extended arm.
Figure 6:
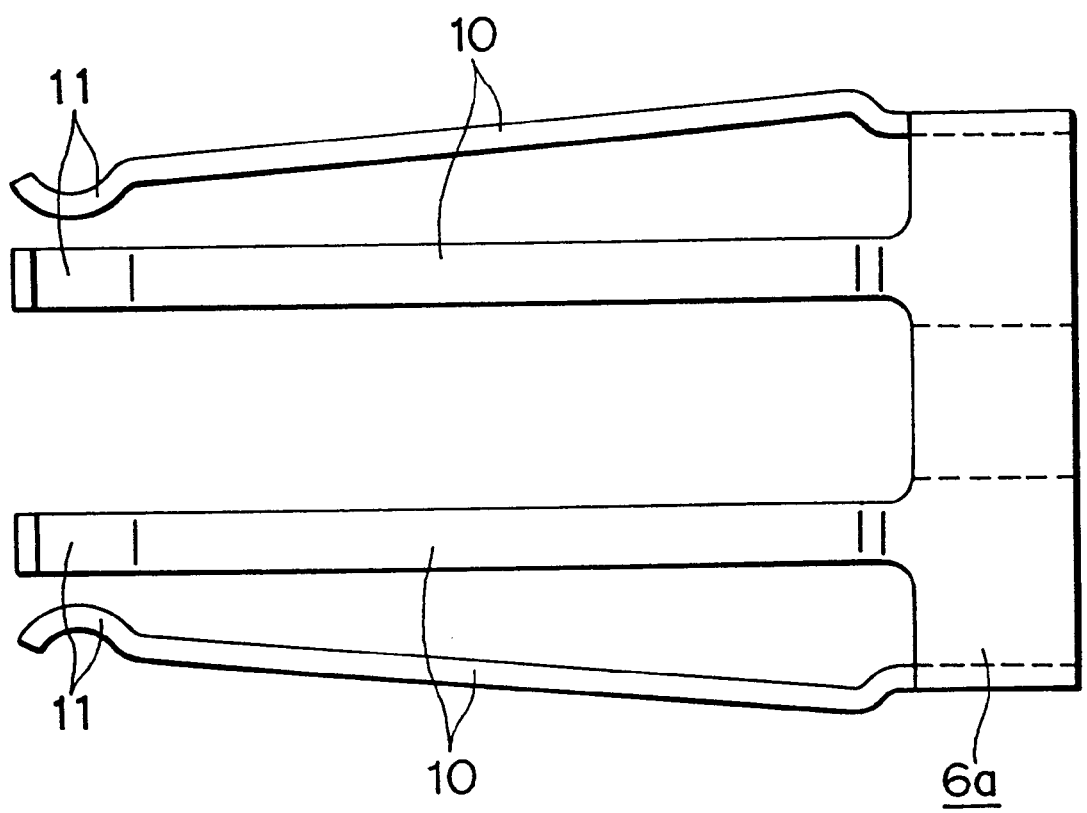
FIG. 6 is a view as viewed from rightward in FIG. 5.

FIG. 1 shows one example of an automobile steering apparatus incorporating an intermediate shaft according to the present invention.

A steering apparatus for an automobile involves the use of a mechanism, as schematically shown in FIG. 1, for transmitting a motion of a steering wheel to a steering gear. Referring to FIG. 1, a steering wheel 102 is fixed to a steering shaft 101 rotatably inserted through within a steering column 103. The steering column 103 is fixed to a schematically shown car body 106 through members 104, 105. Rotations of the steering shaft 101 are transmitted to a shaft 111 of an unillustrated steering gear portion via a steering intermediate shaft constructed of universal joints 107, 110 and shaft members 108, 109.

It is generally known that, in the thus constructed steering apparatus, the shaft member of the steering intermediate shaft is constructed as a mechanism for absorbing, when collided, an impact energy and a movement and a deformation of the steering apparatus by an entire length shrinking upon receiving an impact in order to protect a driver from a damage just when a vehicle collision happens. What is widely used as this mechanism is that the steering intermediate shaft is structured so that an outer tube member and a solid inner shaft member are combined with each other by a spline or serration engagement enough to permit a relative movement in the axial direction therebetween. To give an explanation with reference to FIG. 1, an upper portion 108 of the shaft member of the intermediate shaft is formed as a tube member the inner surface of which is formed with a serration or a spline, while a lower portion 109 is formed as a solid inner shaft member the outer surface of which is formed with the serration or the spline. Then, this solid inner shaft member is inserted into the tube member, thus making the serration or spline engagement.

It is, as described above, useful also when assembling the steering apparatus to give a degree of freedom of the axial movement to the intermediate shaft. When the vehicle is assembled, normally the steering gear portion for changing a direction of the wheel is at first fixed to a car body chassis, while the intermediate shaft portion is fixed to the body side integrally with the steering column, and these components are assembled afterward. This is a procedure of how the apparatus is assembled. To describe it referring to FIG. 1, the shaft 111 of the steering gear apparatus exists on the side of the chassis, and the portions higher than the universal joint 110 exist on the body side. When in the assembling process, it follows that the shaft 111 is joined to the joint 110. It is therefore necessary and useful for the intermediate shaft including the inner shaft member and the outer tube member to have the degree of freedom of the movement (expansion and contraction) in the axial direction.

Figure 29:
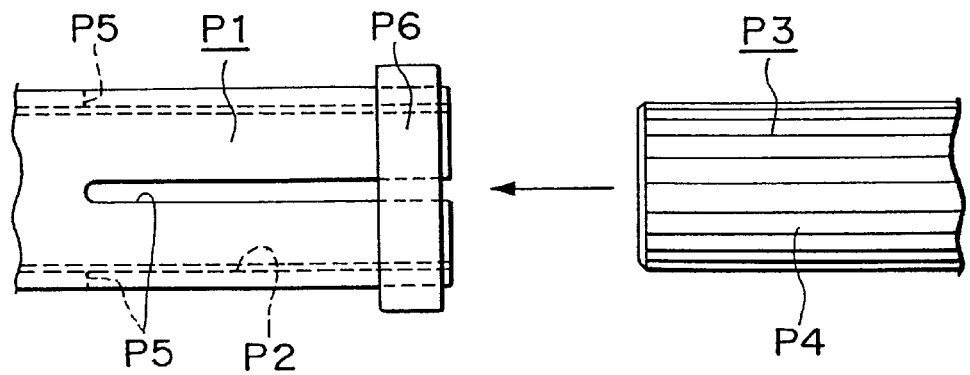
FIG. 29 is a partial side view showing one example of a conventional structure in an exploded state.

FIGS. 2–6 show a first embodiment of the present invention. An expandable/contractible intermediate shaft 7 according to the present invention includes, as previously shown in FIG. 29, an outer tube member 1a, a solid inner shaft member 3a, a plurality of slits 5, 5, and a fastening member 6a. Among these components, a half portion closer to one end (closer to the left in FIG. 2) of the outer tube member 1a is slightly smaller in diameter than the other half portion (a right half portion in FIG. 2), and an inner peripheral portion of the half portion closer to one end is formed with a female serration 8. Further, the inner shaft member 3a is structured such that a half portion closer to one end (closer to the right in FIG. 2) which is inserted into the closer-to-one-end half portion of the outer tube member 1a is set slightly larger in diameter than the other half portion (a left half portion in FIG. 2). Then, an outer peripheral surface of the closer-to-one-end half portion of the inner shaft member 3a is formed with a male serration 9 engaging with the female serration 8.

Further, the slits 5, 5 are formed in a plurality of positions (four positions in the example illustrated therein) at equal intervals in the circumferential direction of one end (the left end in FIG. 2) of the outer tube member 1a and each opened in one edge (the left edge in FIGS. 2 and 3) of the outer tube member 1a. Moreover, the fastening member 6a is formed, in a generally annular shape, of a metal or non-metal plate exhibiting sufficient elasticity and anti-corrosion such as a stainless spring steel and a synthetic resin etc. An inside diameter of the fastening member 6a in a free state is smaller than an outside diameter of one end of the outer tube member 1a in the free state. This fastening member 6a thus structured is fitted to an outer part of one end of the outer tube member 1a in such a state that the inside diameter is elastically expanded. The inside diameter of one end of the outer tube member 1a is possible of an elastic shrinkage through the plurality of slits 5, 5. Accordingly, in the state where the fastening member 6a is fitted to the outer part of one end of the outer tube member 6a, the inside diameter of end of the outer tube member 1a diminishes, and an inner peripheral surface of one end of this outer tube member 1a is elastically fastened to an outer peripheral surface of the inner shaft member 3a. As a result, a backlash in the engagement between the female serration 8 and the male serration 9 disappears.

Particularly, the expandable/contractible intermediate shaft includes a plurality of extended arms 10, 10 (six arms in the example illustrated herein) protruding from one end of the outer tube member 1a as well as extending from a part of the fastening member 6a toward the intermediate portion of the inner shaft member 3a. These extended arms 10, 10 are each provided integrally with the fastening member 6a and are disposed in an imaginary space taking a frustoconical configuration so that a spacing therebetween becomes smaller as they approach front ends (left ends in FIGS. 2, and 6). Further, the tips of the extended arms 10, 10 are provided with bent portions 11, 11. Inner peripheral side surfaces, facing to the outer peripheral surface of the inner shaft member 3a, of these bent portions 11, 11 are formed as concave surfaces each assuming a circular arc, while outer peripheral side surfaces thereof on the opposite side are formed as convex surfaces each assuming the circular arc. Then, an elastic ring 12 formed in an annular shape and exhibiting an elastic force enough to diminish the diameter is externally fitted to each of the bent portions 11, 11 by use of an elastic material such as rubber and elastomer etc or a tension spring. A diameter of an inscribed circle of each of the plurality of bent portions 11, 11 is set smaller than an outside diameter of the intermediate portion of the inner shaft member 3a in a state where at least elastic ring 12 is externally fitted to each of the bent portions 11, 11, and the inner shaft member 3a is not inserted inwardly of these bent portions 11, 11.

In a state where the expandable/contractible intermediate shaft according to the present invention is assembled, the intermediate portion of the inner peripheral side surface of each of the bent portions 11, 11 provided at the tips of the extended arms 10, 10, is elastically pushed against the outer peripheral surface of the intermediate portion of the inner shaft member 3a, whereby the intermediate portion of the inner peripheral side surface of each of these bent portions 11, 11 is slidably brought into contact with the outer peripheral surface of the inter mediate portion of the inner shaft member 3a. If the inner shaft member 3a displaces in such a direction (a left direction in FIGS. 2 and 3) as to disengage from within the outer tube member 1a, the inner peripheral surfaces of the bent portions 11, 11 engage with a stepped portion 23 formed at the other edge of the male serration 9, thereby preventing the inner shaft member 3a from disengaging from the outer tube member 1a except when required.

Note that a proximal end of a yoke 14 of a first universal joint 13 is joined to the other end (a right end in FIG. 2) of the outer tube member 1a via a vibration absorbing cylinder 15 and a pin 16. The other end of the outer tube member 1a is connected to an end of an unillustrated steering shaft via the first universal joint 13. On the other hand, a proximal end of a yoke 18 of a second universal joint 17 is fixed by welding to the other end (a left end in FIG. 2) of the inner shaft member 3a. The other end of the inner shaft member 3a is connected to an input shaft of an unillustrated steering gear through the second universal joint 17.

In the case of the expandable/contractible intermediate shaft of the present invention, if the inner shaft member 3a displaces in such a direction as to disengage from within the outer tube member 1a, the inner peripheral surfaces of the bent portions 11, 11 provided at the tips of the extended arms 10, 10 engage with the stepped portion 23. Therefore, it never happens that the inner shaft member 3a disengages from the outer tube member 1a except when required. As a result, it is feasible to prevent inconveniences such as being incapable of assembling and an occurrence of non-constant velocity etc, which might be caused when the inner shaft member 3a disengages from the outer tube member 1a.

Incidentally, in the event of a collision accident, the intermediate portion of the inner peripheral side surface of each of the bent portions 11, 11 slides on the outer peripheral surface of the inner shaft member 3a, thereby permitting the total length of the expandable/contractible intermediate shaft 7 to diminish. The inner peripheral side surface of each of the bent portions 11, 11 is formed as the convex surface in the circular-arc shape, and hence the inner peripheral side surface of each of the bent portions 11, 11 is capable of smoothly sliding on the outer peripheral surface of the inner shaft member 3a. Further, the fastening member 6a is required to have a sufficient anti-corrosion property in terms of a necessity for preventing the backlash in the engaging portions between the female and male serrations 8, 9 over a long period of time. By contrast, the elastic ring 12 has no more use after the expandable/contractible intermediate shaft 7 has been assembled to the steering apparatus, and is not therefore particularly required to have the anti-corrosion property or weather resistance. Further, if the inner peripheral side surfaces of the bent portions 11, 11 can engage with the stepped portions 23 with a sufficient strength by only elasticities of the extended arms 10, 10, the elastic ring 12 may be also omitted.

Figure 7:
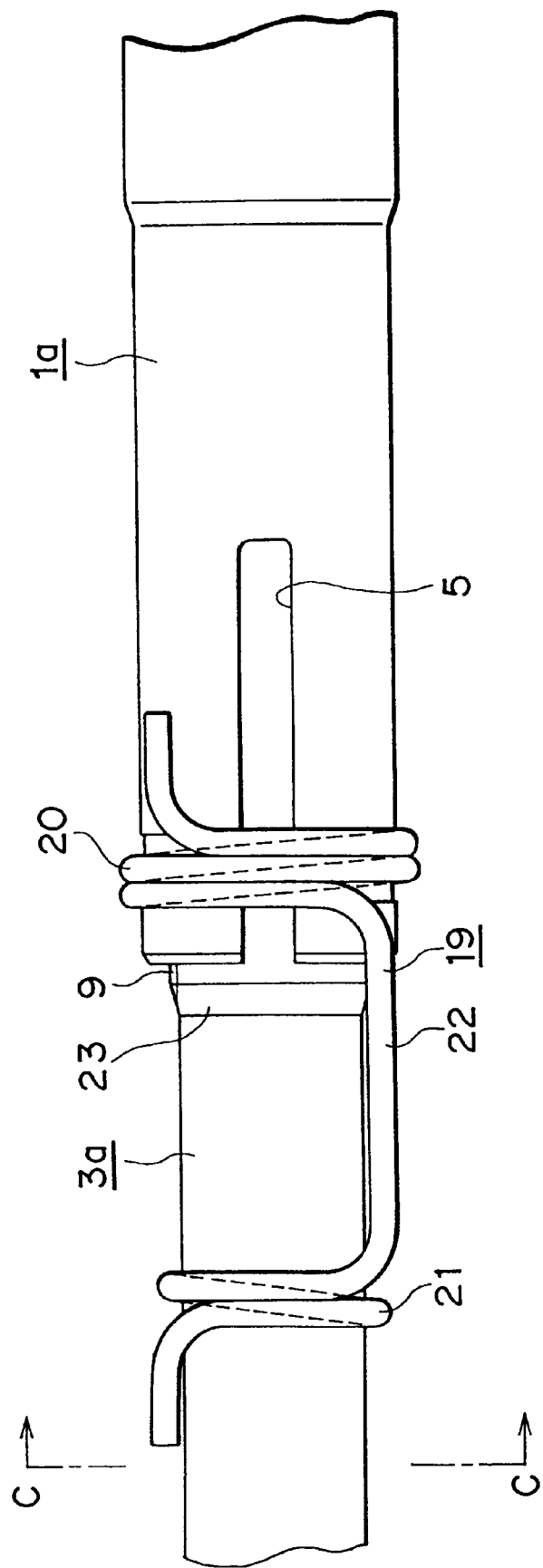
FIG. 7 is a partial side view showing a second embodiment of the present invention.
Figure 8:
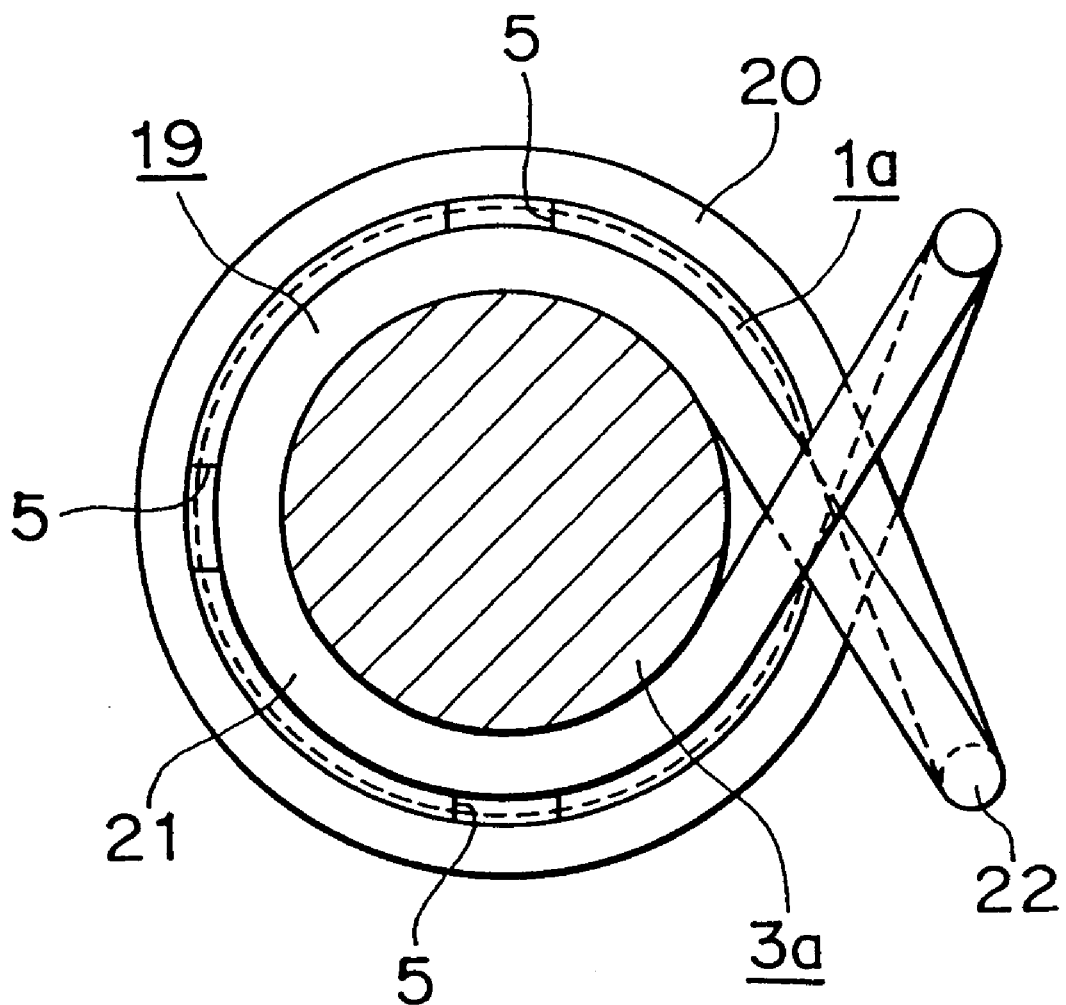
FIG. 8 is a sectional view taken substantially along the line C—C in FIG. 7.

Next, FIGS. 7 and 8 show a second embodiment of the present invention. In the second embodiment, a torsion coil spring 19 composed of an elastic metal wire such as a stainless spring steel incorporates a function of preventing a backlash in the engaging portions between the female serration 8 (FIGS. 2 and 3) formed in the inner peripheral surface of one end of the outer tube member 1a and the male serration 9 formed on the outer peripheral surface of one end of the inner shaft member 3a, and also a function of preventing the inner shaft member 3a from disengaging from the outer tube member 1a except when required. Therefore, one end (a right end in FIG. 7) of the torsion coil spring 19 is provided with a fastening member 20, and the other end thereof is provided with a disengagement preventing ring member 21, respectively. The fastening member 20 and the disengagement preventing member 21 are connected to each other through an extended arm member 22. An inside diameter of the fastening member 20 in the free state is smaller than an outside diameter of one end of the outer tube member 1a in the free state. Further, the inside diameter of the disengagement preventing ring member 21 in the free state is slightly larger than the outside diameter of the inner shaft member 3a.

The above-described torsion coil spring 19 is so arranged that, as shown in FIGS. 7 and 8, the fastening member 20 is externally fitted to one end of the outer tube member 1a while the disengagement preventing ring member 21 is externally fitted to the intermediate portion of the inner shaft member 3a in such a state that each of the inside diameters is elastically expanded. As a result, the fastening member 20 elastically diminishes the inside diameter of one end of the outer tube member 1a, thus preventing the backlash in the engaging portions between the female serration 8 and the male serration 9. Further, if the inner shaft member 3a displaces in such a direction as to disengage from within the outer tube member 1a, the inner peripheral edge of the disengagement preventing ring member 21 engages with the stepped portions 23 formed at the other edge of the male serration 9, thereby preventing the inner shaft member 3a from disengaging within from the outer tube member 1a except when required. Other configurations and operations are the same as those in the first embodiment discussed above, and hence the illustrations and explanations of the same components are omitted.

Note that the closer-to-one-end outer peripheral surface of the intermediate portion of the inner shaft include an engaging portion formed over the entire periphery thereof as a convex portion or a concave groove different from the stepped portion 23 of the serration 9. In this case, inner peripheral side surface of each of the bent portions 11, 11 or the inner peripheral edge of the disengagement preventing ring member 21 engages with the another engaging portion described above, thereby preventing the inner shaft member 3a from disengaging from within the outer tube member 1a except when required.

Figure 9:
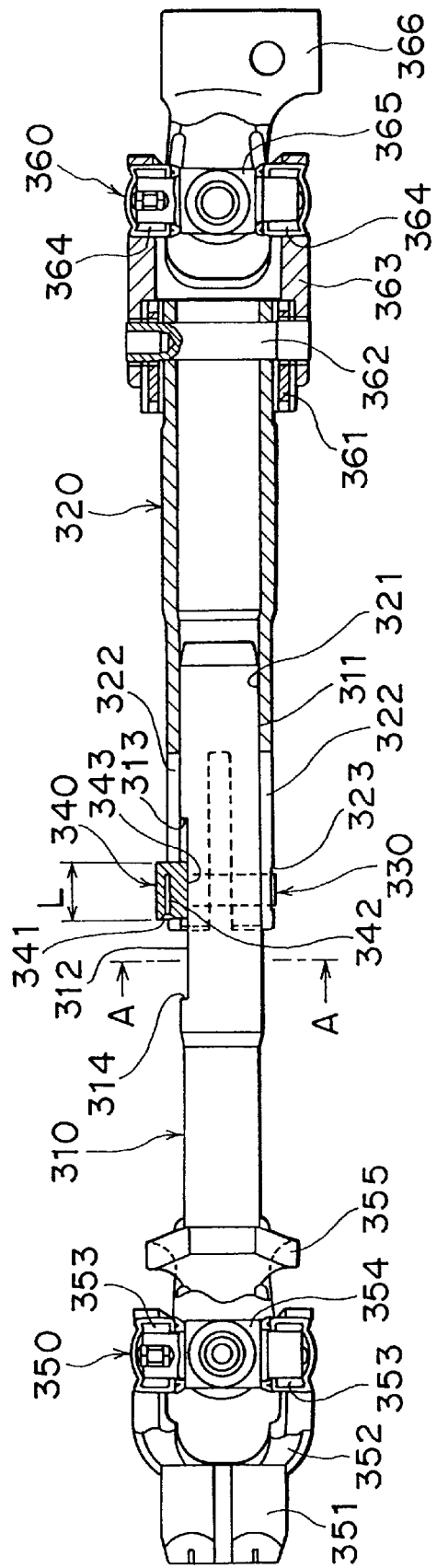
FIG. 9 is a vertical sectional view containing a shaft, showing a third embodiment of the present invention.
Figure 10:
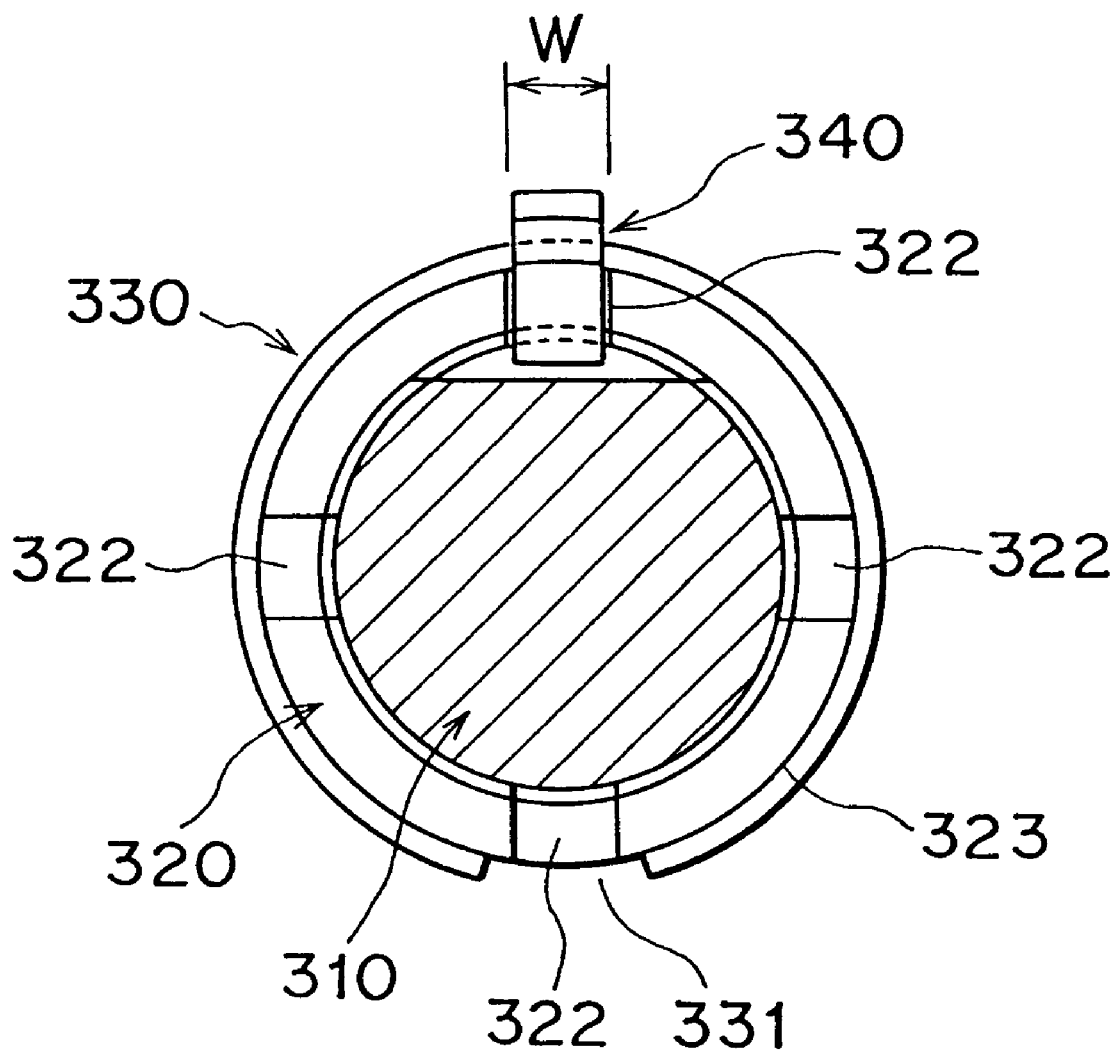
FIG. 10 is a view taken substantially along the arrow line A—A in FIG. 9.

FIGS. 9 and 10 show the intermediate shaft in a third embodiment of the present invention. Specifically, FIG. 9 is a vertical sectional view including an inner shaft member and an axis of the outer tube member, and FIG. 10 is a view taken along the arrow line A—A in FIG. 9.

The intermediate shaft shown in FIGS. 9 and 10 is structured of a solid inner shaft member 310, an outer tube member 320, a fastening member 330, and a disengagement preventing member 340.

A first universal joint 350 is attached to a proximal end (a left side in FIG. 9) of the shaft member 310, and a second universal joint 360 is attached to a proximal end (a right side in FIG. 9) of the outer tube member 320.

To start with, these first and second universal joints 350, 360 will briefly be explained, after which a detailed description will be given regarding the shaft member 310, the outer tube member 320, the fastening member 330 and the disengagement preventing member 340.

The first universal joint 350 includes a first arm 352 taking substantially a C-shape and fixed to a yoke 351. The arm 352 rotatably supports one shaft of a first joint cross 354 through bearings 353, 353 at both ends thereof. The other shaft of the first joint cross 354 rotatably supports a second yoke 355. A solid inner shaft member 310 is defined as one of the principal components of the present invention, a proximal end of which is fixed to the second yoke 355.

A second universal joint 360 includes a cylindrical elastic shock-absorbing cylinder 361 fitted to the proximal end of the outer tube member 320. A torque transmission member 362 penetrating the proximal end of the outer tube member 320 in a direction orthogonal to the shaft passes through within the elastic shock absorbing cylinder 361. The torque transmission member 362 is supported by a third yoke 363. More specifically, the third yoke 363 holds the proximal end of the outer tube member 320 through the elastic shock absorbing cylinder 361 and transmits the torque to the outer tube member 320 via the torque transmission member 362. The third yoke 363 rotatably supports one shaft of a second joint cross 365, and the other shaft of the second joint cross 365 rotatably supports a fourth yoke 366 through bearings.

The first and second universal joints 350, 360 described above are constructed such that the rotations of the first yoke 351 are transmitted to the shaft member 310 via the first arm 352, the first joint cross 354 and the second yoke 355. Then, the rotations of this shaft member 310 are transmitted from the outer tube member 320 to the torque transmission member 362 of the second universal joint 360, and further to a fourth yoke 366 through the third yoke 363 and the second joint cross 365. The rotations may also be transmitted in a reverse direction, i.e., from the fourth yoke 366 to the first yoke 351.

The first universal joint 350 described above is connected to the proximal end of the shaft member 310, and an outer spline 311 is formed in an outer peripheral surface (outside) of the tip thereof. The outer spline 311 is formed slightly longer than the half of the total length (the length in the axial direction) of the shaft member 310. A notched portion 312 having a length substantially equal to the half of the effective length of the outer spline 311, is formed in a part of the proximal end of the outer spline 311. The foremost end of the notched portion 312 is provided with a stepped disengagement preventing member 313 for preventing a disengagement of the shaft member 310 by engaging with a disengagement preventing member 340 which will be described in detail later. Further the rearmost end of the notched portion 312 is provider with a stepped stopper 314 for regulating a limit of insertion of the shaft member 310 by engaging with the disengagement preventing member 340.

The second universal joint 360 described above is connected to the proximal end of the outer tube member 320, and an inner spline 321 is formed in an inner peripheral surface (inside) of the tip portion thereof. The inner spline 321 is formed by substantially the half of the entire length (the length in the axial direction) of the outer tube member 320. The tip of the outer tube member 320 is formed with four slits 322 extending in the axial direction. An axial length of this slit 322 is substantially the length of the inner spline 321. Further, the four slits 322 are, as shown in FIG. 10, formed in such positions as to equally divide the outer tube member 320 by four in the peripheral direction. Furthermore, an annular groove 323, the outside diameter of which is slightly smaller than other portions, is formed in the vicinity of the tip edge of the outer tube member 320. A fastening member 330 is fitted in this groove 323.

The fastening member 330 is an annular member including a notched portion 331 formed in a part thereof, and a width thereof in the axial direction is set slightly smaller than a width of the groove 323 in the axial direction. Accordingly, the fastening member 330, when fitted in the groove 323, becomes unmovable in the axial direction. Note that the fastening member 330 may be composed of, e.g., a metal.

The disengagement preventing member 340 is formed in substantially a rectangular parallelepiped shape. A length L of the disengagement preventing member 340 is, as shown in FIG. 9, larger than a width of the fastening member 330, and a width W of the disengagement preventing member 340 is, as shown in FIG. 10, set slightly smaller than a width of the slit 322. The disengagement preventing member 340, as shown in FIG. 9, includes a notched portion 342 extending rightward and having an aperture 341 positioned slightly above the center in a heightwise direction and leftward in FIG. 9. Note that the notched portion 342 has no aperture rightward in FIG. 9. In a state where the fastening member 330 is fitted in this notched portion 342, a lower surface 343 of the disengagement preventing member 340 is slightly raised from the notched portion 312 of the shaft member 310. Incidentally, when this lower surface 343 comes into contact with the notched portion 312, there acts a force for depressing the shaft member 310 downward, with the result that a backlash between the shaft member 310 and the outer tube member 320 can be prevented.

A joining structure of the thus constructed intermediate shaft is assembled as follows.

In a state where the first universal joint 350 and the second universal joint 360 are set in phase, the shaft member 310 is inserted from the tip of the outer tube member 320, and an inner spline 311 is engaged with an outer spline 321. Thereafter, the fastening member 330 is fitted in the groove 323 in the vicinity of the tip edge of the outer tube member 320. The tip of the outer tube member 320 formed with the slits 322 is deformed inwards, thereby reducing the backlash between the outer spline 311 of the shaft member 310 and the inner spline 321 of the outer tube member 320. Then, the disengagement preventing member 340 is fitted in a position, closer to the proximal end of the outer tube member 320 than the fastening member 330, of the slit 322 positioned upward among the four slits 322 of the outer tube member 320, and is inserted down into the notched portion 312 of the shaft member 310 so as to make it slide leftward in FIG. 9, thus fitting it to the fastening member 330 through the aperture 341. In this state, the lower surface 343 of the disengagement preventing member 340 enters inside the notched portion 312.

The assembling operation described above leads a state as shown in FIGS. 9 and 10. In this state, the fastening member 330 is fitted in the groove 323 of the outer tube member 320 and is therefore unable to move in the axial direction of the outer tube member 320, and further the disengagement preventing member 340 is unable to move leftward (in a disengaging direction of the shaft member 310) in FIGS. 9 and 10 with respect to the fastening member 330. Namely, the disengagement preventing member 340 is constructed integrally with the outer tube member 320 with respect to the force acting in the disengaging direction of the shaft member 310.

Herein, when moving in the disengaging direction of the shaft member 310, the disengagement preventing member (step) 313 of the notched portion 312 of the shaft member 310 impinges upon a lower edge of the disengagement preventing member 340. At this time, the disengagement preventing member 340 is, as described above, integral with the outer tube member 320, and hence the shaft member 310 is hindered from further moving in the disengaging direction with respect to the outer tube member 320. That is, the shaft member 310 is prevented from coming out of the outer tube member 320.

Note that when the shaft member 310 moves in the inserting direction, the stopper 314 of the notched portion 312 impinges upon the disengagement preventing member 340, thereby preventing a further inserting motion.

Figure 11:
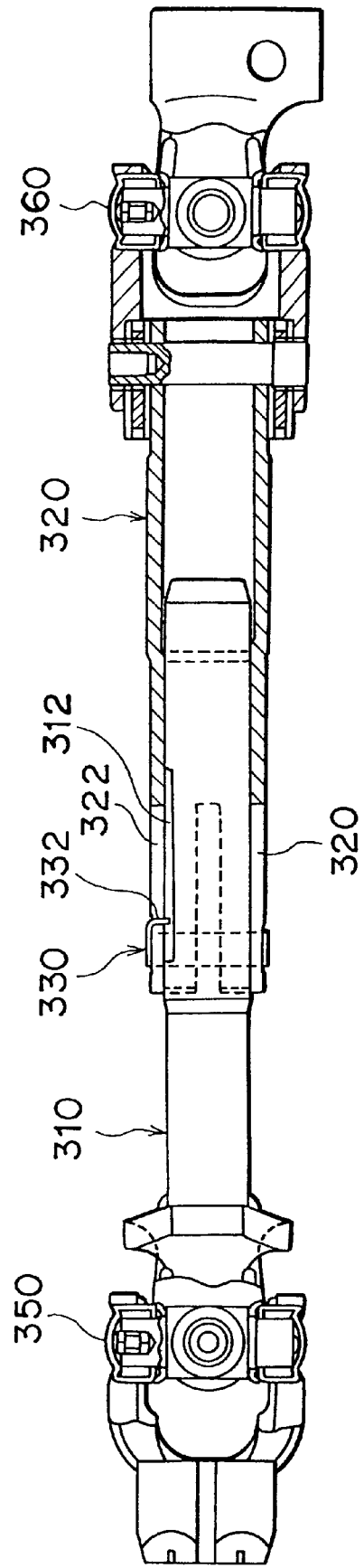
FIG. 11 is a vertical sectional view containing a shaft, showing a fourth embodiment of the present invention.

FIG. 11 shows a fourth embodiment. The fourth embodiment is different from the third embodiment with respect to only the disengagement preventing member. Note that same other components are marked with the identical numerals, and repetitive explanations are omitted. This same manner is taken from the fifth embodiment onward.

Specifically, in accordance with the fourth embodiment, the shaft member 310 is inserted into the outer tube member 320, and a part of the fastening member 320, after this member 320 has been fitted, is bent downward as illustrated in FIG. 11 and thus formed as a bent portion 332. This bent portion 332 is structured to enter the notched portion 312 of the shaft member 310 through the slit 322. This bent portion 332 operates the same as the disengagement preventing member 340 used in the third embodiment.

Figure 12:
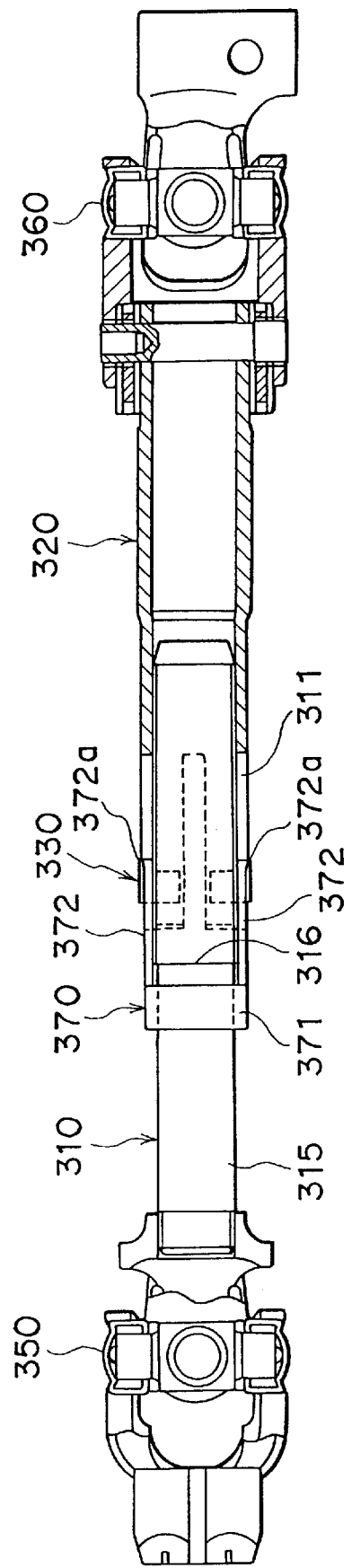
FIG. 12 is a vertical sectional view containing a shaft, showing a fifth embodiment of the present invention.
Figure 13A:
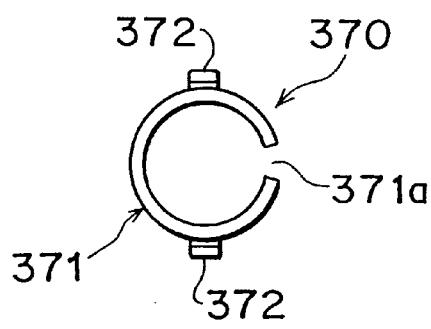
FIGS. 13A and 13B are views each showing a single piece of disengagement preventing member in the fifth embodiment.
Figure 13B:
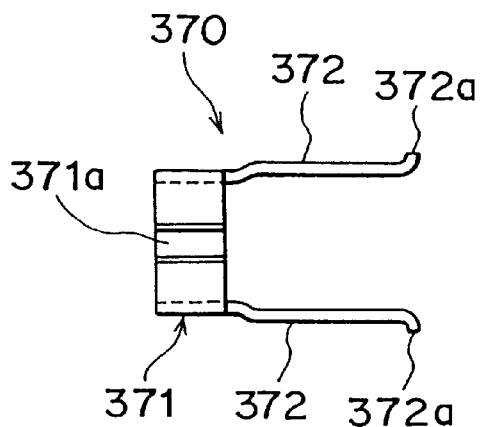

FIGS. 12, 13A and 13B show a fifth embodiment. The fifth embodiment is different from the third embodiment in terms of the shaft member 310 not being formed with the notched portion 312 and using an illustrated disengagement preventing member 370 replacing the disengagement preventing member 340.

The disengagement preventing member 370 is constructed of an annular member 371 partially formed with a notched portion 371a, and of two leg members 372. The proximal end of each leg member 372 is connected to the annular member 371, and a pawl 372a is formed at the tip thereof.

The disengagement preventing member 370 in the fifth embodiment is constructed so that, as shown in FIG. 12, the annular member 371 is, in the vicinity of a boundary 316 between an outer spline 311 and a portion (hereinafter referred to as a non-spline portion 315) excluding the spline 311, fitted to this non-spline portion 315, and legs 372 are fitted in the upper and lower slits 322 of the outer tube member 320. In this state, the tip of the pawl 372a of the leg 372 protrudes outside the slits 322. Note that a diameter of the non-spline portion 315 is smaller than a diameter of a circumference connecting respective edges of the teeth of the outer spline 311, and hence it follows that a stepped portion is formed at the boundary 316.

Herein, when the shaft member 310 moves in the disengaging direction, the stepped portion of the boundary 316 of the shaft member 310 impinges on the annular member 371. Further, the pawl 372a of the leg 372 impinges upon the fastening member 330. The disengagement of the shaft member 310 is thereby inhibited.

The disengagement preventing member 370 described above may be composed of, e.g., a metal such as iron etc.

Figure 14A:
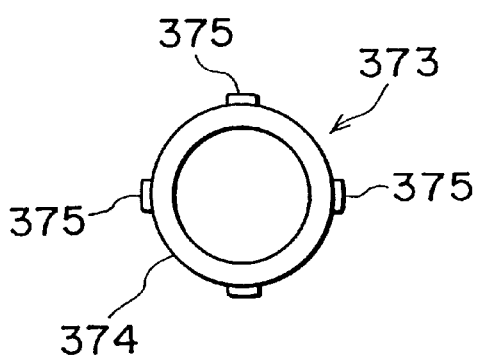
FIGS. 14A and 14B are views each showing another single piece of disengagement preventing member in the fifth embodiment.
Figure 14B:
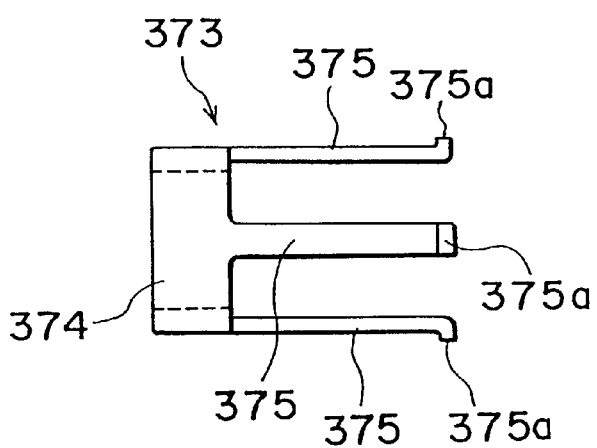

Incidentally, if composed of, e.g., a synthetic resin instead of the iron, as in the case of a disengagement preventing member 373 shown in FIGS. 14A and 14B, the annular member 374 is formed with no notch, and there may be provided four legs 375 each having a pawl 375a.

Figure 15:
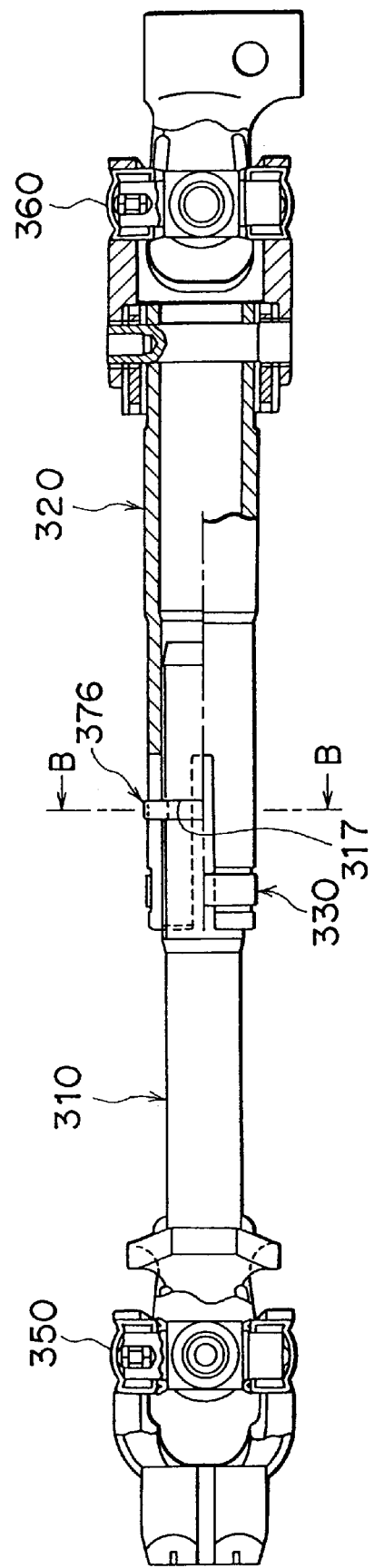
FIG. 15 is a partial fragmentary front view showing a sixth embodiment of the present invention.
Figure 16:
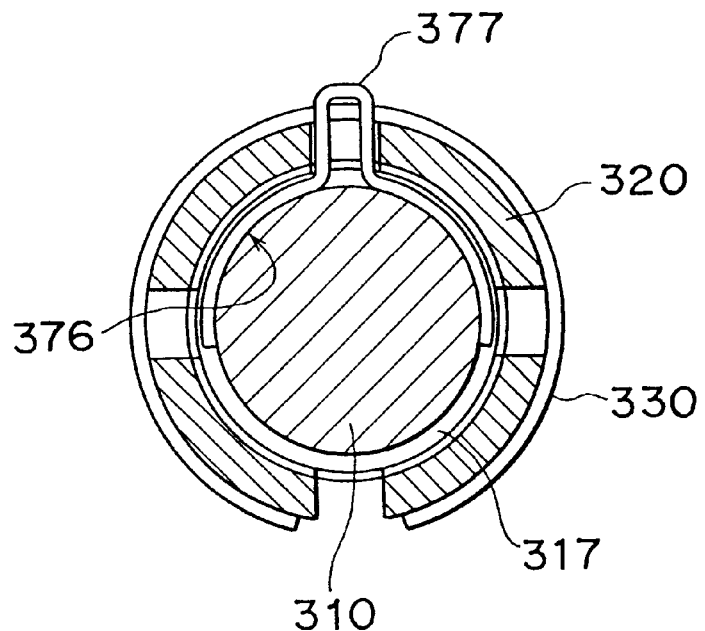
FIG. 16 is a view taken substantially along the arrow line B—B in FIG. 15.

FIGS. 15 and 16 show a sixth embodiment. Note that FIG. 15 is a partial sectional view of only the upper half portion, and FIG. 16 is a view taken substantially along the arrow line B—B in FIG. 15.

A different point of the sixth embodiment from the fifth embodiment is that the shaft member 310 is formed with a groove 317 in place of the disengagement preventing member 370, and further a disengagement preventing member 376 is fitted in this groove 317.

The annular groove 317 is formed in a part of the outer spline 311 of the shaft member 310. Then, the semi-circular disengagement preventing member 376 is fitted in this groove 317. A protruded portion 317 protruding upward from the slit 322 of the outer tube member 320 is provided at the center of the disengagement preventing member 376.

When the shaft member 310 moves in the disengaging direction, this protruded portion 377 impinges on the fastening member 330, thus hindering a further disengaging motion.

Figure 17:
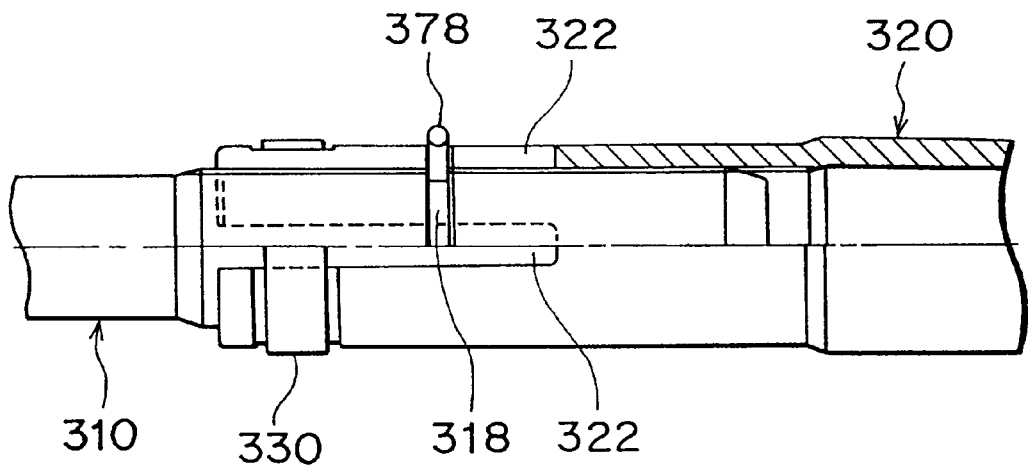
FIG. 17 is a partial fragmentary front view showing the sixth embodiment of the present invention.

FIG. 17 shows a seventh embodiment, wherein the groove used in the sixth embodiment is narrowed into a groove 318, and this groove 318 is wound with a wire as a disengagement preventing member 378, a part of which protrudes from the slit 322.

When the shaft member 310 moves in the disengaging direction, this wire impinges upon the fastening member 330, thereby hindering a further disengaging motion.

An eighth embodiment of the steering intermediate shaft of the present invention will hereinafter be discussed with reference to FIGS. 18A to 23.

Figure 18A:
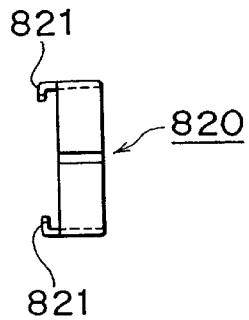
FIGS. 18A–18C are a front view, a side view and a plan view each showing a fastening member of the steering intermediate shaft in a seventh embodiment of the present invention.
Figure 18B:
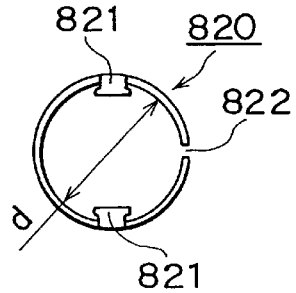
Figure 18C:
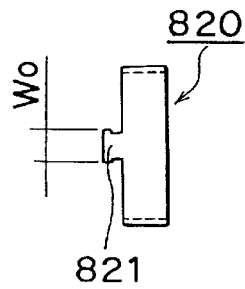

FIGS. 18A–18C are a front view, a side view and a plan view each illustrating a fastening member used in the eighth embodiment. A fastening member 820 takes such a configuration that a narrow and thin flat plate is molded in an annular shape, and has an aperture at a part 822 thereof. Protruded portions 821 so crooked inward as to protrude in the axial direction are formed in two face-to-face positions in a diametrical direction of the ring of the fastening member 820. A width of the crooked portion 821 is $w_0$. The fastening member 820 is composed of a material exhibiting an elasticity, and, in a natural state where an external force is not applied, a minor diameter of the ring is d.

Figure 19B:
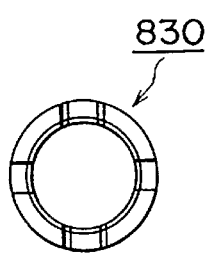
FIGS. 19A–19C are a front view, a side view and a plan view each showing an outer tube member of the steering intermediate shaft in an eighth embodiment of the present invention.
Figure 19A:
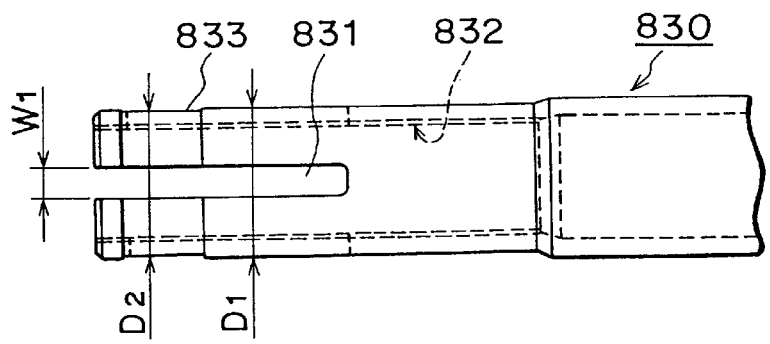
Figure 19C:
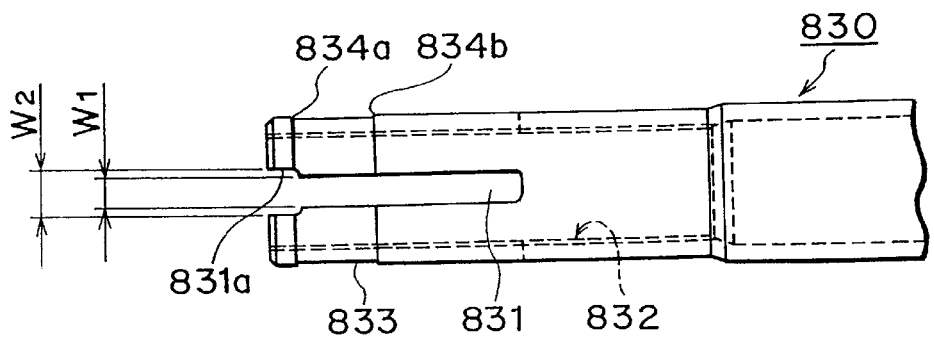

FIGS. 19A–19C are a front view, a side view and a plan view each showing an outer tube member of the intermediate shaft. An outer tube member 830 includes slits 831 each having a width $W_1$ which are formed in totally four positions at equal intervals of 90 degrees in the peripheral direction thereof. Each of the slits 831 has an aperture at the edge of the tube member. Aperture-side edges of the two slits facing to each other among the four slits 831, are each provided with a large-width portion 831a with a width $W_2$ larger than the width $W_1$. A magnitude relationship between these widths $W_1$, $W_2$ and $w_0$ of the protruded portion 821 of the fastening member 820 is given such as:

$$W_1 < w_0 < W_2$$

A major diameter of the tube member 830 is $D_1$, and an annular groove 833 with a major diameter $D_2$ set slightly smaller than $D_1$ is formed in a part in the vicinity of the edge thereof. Shoulder portions 834a, 834b are shaped by a difference between the major diameters $D_2$ and $D_1$ at both ends of the annular groove in the axial direction. A magnitude relationship between these major diameters $D_1$, $D_2$ and the minor diameter d of the fastening member is given such as: $d < D_2 < D_1$.

An inner peripheral surface of the tube member 830 is formed with a serration 832 extending over a predetermined length in the axial direction from the edge thereof.

FIGS. 20A–20C are a front view, a side view and a plan view each showing a solid inner shaft member of the intermediate shaft. An outer periphery of an inner shaft member 840 has a serration 841 formed over a predetermined length in the axial direction on the side of joining to the tube member 830. The serration 841 is set to such a dimension as to fit at a minute gap in the serration 832 of the tube member 830. Projections 842 molded by plastic working on some of the serrated crests are provided in two positions facing to each other in the radial direction at the terminal of the serration on such a side as to be away from the edge of the inner shaft member 840. The projections 842 protrude into the slits of the tube member when the inner shaft member 840 is fitted in the tube member 830.

A method of how the parts explained above are combined will be described with reference to FIGS. 21A and 21B. To start with, the projections 842 of the inner shaft member 840 are matched with the slits 831 having the large-width portions 831a at the edge, thus fitting the shaft member 840 into the tube member 830. At this time, the serration 841 on the outer periphery of the shaft member 840 is so set as to be fitted to the serration 832 in the inner periphery of the tube member 830 at a minute gap, and hence the shaft member 840 can slide on the tube member 830 in the axial direction by a small force. Next, the protruded portion 821 of the fastening member 820 is matched with the same slit 831 as the above-mentioned, and thus fitted onto an annular groove 833 along the outer periphery of the tube member 830. Then, the protruded portion 821 is intruded into the width $W_1$ portion of the slit 831 and fixed thereto. At this time, the width $w_0$ of the protruded portion 821 is larger than the width $W_1$ ($W_1 < w_0$), and therefore the tube member 830 is expanded at the slits 831. With this arrangement a fastening force of the fastening member 820 does not act on the tube, and the serrations can slide on each other by the same small force as the one before fitting the fastening member 820. This state is illustrated in FIGS. 21A and 21B.

Subsequently, the procedure of assembling the steering apparatus will be explained with reference to FIGS. 21A–23.

To begin with, the intermediate shaft is set beforehand in the state shown in FIGS. 21a and 21B by the procedure explained above. In this state, the intermediate shaft is fixed to the car body together with an unillustrated steering column etc. The other steering gear 809 is fixed to the chassis side. As discussed above, the serrations in this state are fitted at the minute gap, and therefore the inner shaft member 840 is slidable on the outer tube member 830 in the axial direction. In the state shown in FIGS. 21A and 21B, the protruded portion 821 of the fastening member 820 and the projection 842 of the shaft member 840, have such a positional relationship as to be apart from each other to some extent.

Figure 22:
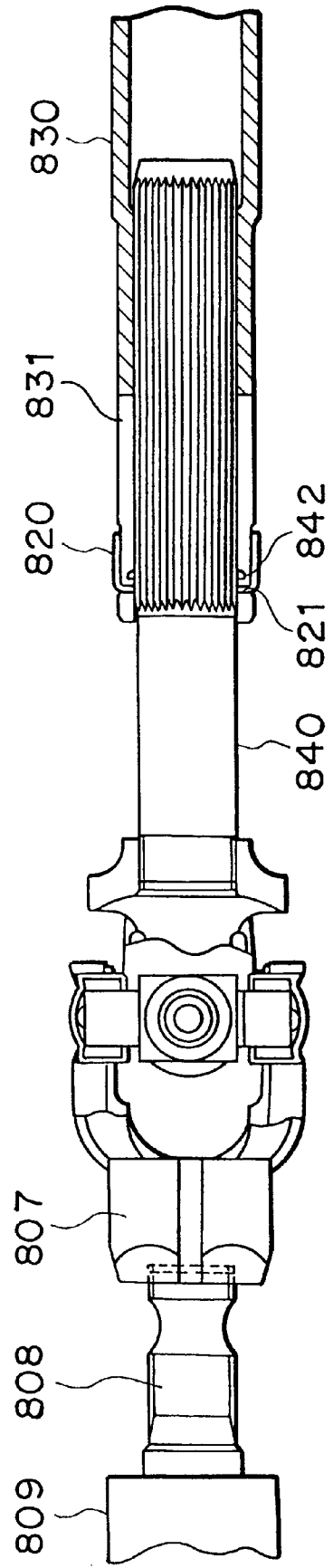
FIG. 22 is a view showing one state when connecting the steering intermediate shaft to the steering gear in the seventh embodiment as well as showing a state where a yoke of a joint of the intermediate shaft is slightly inserted into an input shaft of the steering gear.
Figure 23:
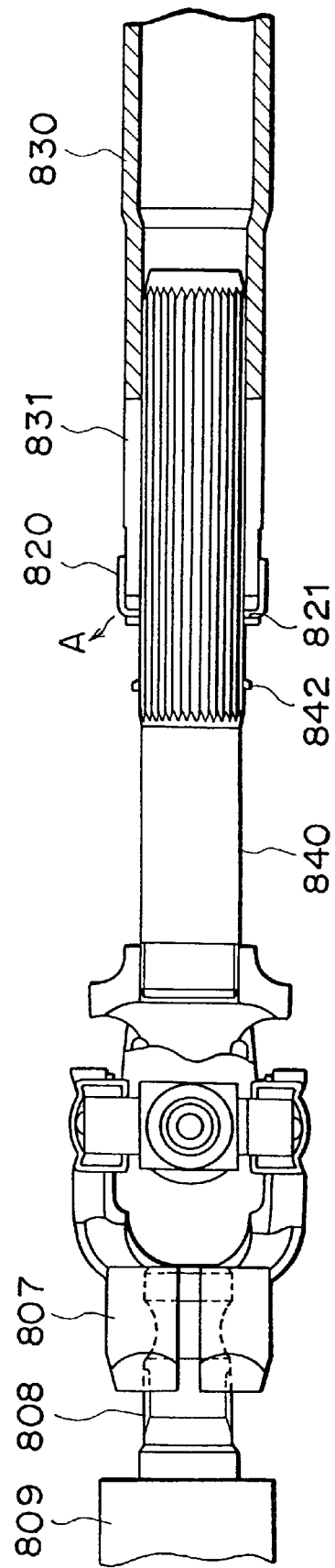
FIG. 23 is a view showing one state when connecting the steering intermediate shaft to the steering gear in the seventh embodiment as well as showing a state where a yoke of a joint of the intermediate shaft is sufficiently inserted into an input shaft of the steering gear.

FIG. 22 shows a state where the shaft member 840 is pulled to some extent out of the tube member 830, and a yoke 807 of the universal joint slightly enters an input shaft 808 of the steering gear. In this state also, the projection 821 of the fastening member is still a bit apart from the projection 842 of the inner shaft member 840 and fitted in the width $W_1$ portion of the slit 831, and consequently the shaft member 840 is easy to slide.

When the yoke 807 is intruded further into the input shaft 808 by further pulling the inner shaft member 840 from the tube member 830 in that state, the projection 842 impinges upon the protruded portion 821, thus pushing and moving the protruded portion 821 leftward in the Figure. The protruded portion 821 thereby moves off the width $W_1$ portion of the slit 831 into a width $W_2$ portion (incidentally, an axial dimension of the large-width portion 831a is set enough to accept the protruded portion of the fastening member). From this time onward the fastening force of the fastening member 820 becomes effective. That is, the minor diameter d of the fastening member 820 in the natural state is smaller than the major diameter $D_2$ of the annular groove 833 into which the fastening member is fitted, and therefore the fastening member 820 fastens the tube member 830 inward. The serration 832 in the inner periphery of the tube member 830 is thereby tightly engaged with the serration 841 on the outer periphery of the inner shaft member 840, with the result that the axial sliding force between the inner shaft member 840 and the tube member 830 increases. At this time, however, the yoke 807 has already been fitted into the input shaft 808, and hence the increase in the sliding force does not influence so much an operability.

After the protruded portion has been moved off into the large-width portion 831a of the slit, the fastening member 820 is further pushed leftward and impinges upon the shoulder portion 834a of the annular groove 833, thereby hindering the movement. When the shaft member 840 is pulled further therefrom out of the tube member 830 and moved leftward in the Figure, the protruded portion 821 of the fastening member 820 is elastically bent by pushing in an arrow direction A in the Figure by the projection 842 of the inner shaft member 840, and moves over the projection 842 (i.e., the projection 842 moves under the protruded portion 821). Consequently, the projection 842 moves off the protruded portion 821. The inner shaft member is thereby moved further leftward and brought into a state shown in FIG. 23, in which the input shaft 808 of the steering gear 809 is completely fitted to the yoke 807.

In this state, the fastening force of the fastening member 820 effectively acts, and therefore a serration 832 of the tube member 830 tightly engages with a serration 841 of the inner shaft member 840, whereby a backlash therebetween when transmitting the rotating force is reduced.

Figure 24A:
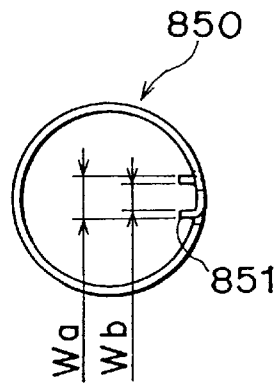
FIGS. 24A and 24B are a front view and a side view each showing the fastening member of the steering intermediate shaft in an eighth embodiment of the present invention.
Figure 24B:
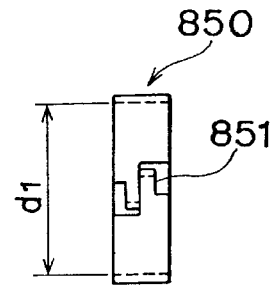

Subsequently, a ninth embodiment of the present invention will be explained referring to FIGS. 24A–27. The major difference between the ninth embodiment and the eighth embodiment is a configuration of the fastening member. The fastening member in the ninth embodiment is shown in FIGS. 24A and 24B. FIG. 24A is a front view, and FIG. 24B is a side view. A fastening member 850 is, as in the case of the fastening member 820 in the eighth embodiment, is constructed such that a narrow and thin flat plate compose of an elastic material is formed in an annular shape. Unlike the fastening member 820, however, the fastening member 850 has portions 851 at both edges of the flat plate which are made narrow in width and are overlapped with each other in the peripheral direction at the small-width portions at both edge as shown in FIG. 24B when forming a ring. Then, a part of the small-width portion is bent inwardly of the ring, thus forming a bent portion 851 protruding into the ring as illustrated in FIG. 24A. Incidentally, let $d_1$ be an inside diameter of the fastening member, $w_a$ be an outer dimension of the bent portion, and $w_b$ be an inner dimension thereof.

Figure 25B:
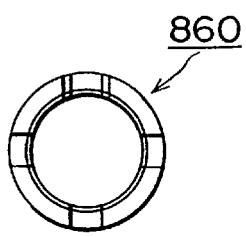
FIGS. 25A–25C are a front view, a side view and a plan view each showing an outer tube member of the steering intermediate shaft in the eighth embodiment of the present invention.
Figure 25A:
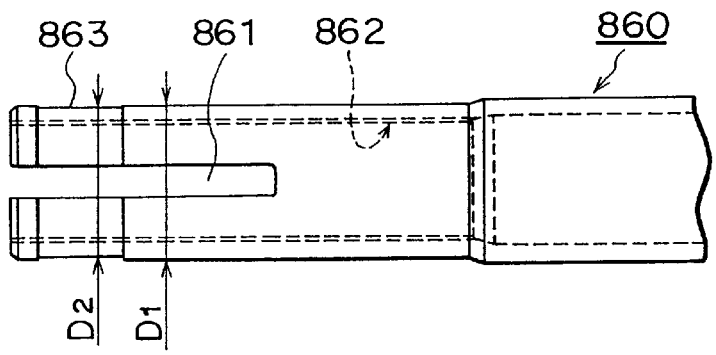
Figure 25C:
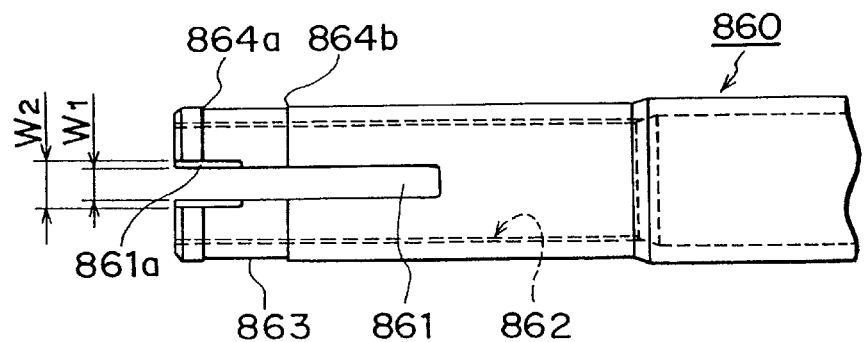

FIGS. 25A–25C are a front view, a side view and a plan view each showing an outer tube member in the ninth embodiment. An outer tube member 860 has substantially the same construction as that of the outer tube member 830 in the eighth embodiment shown in FIGS. 19A and 19B. A slit 861 is the same as the slit 831 in FIGS. 19A and 19B, a serration 862 is the same as the serration 832, an annular groove 863 is the same as the groove 833, and shoulder portions 864a, 864b are the same as the shoulder portions 834a, 834b. Accordingly, the explanations thereof are omitted. The following is a difference from the outer tube member 830 in FIGS. 19A and 19B. To be specific, the protruded portions of the fastening member 820 are provided in the two positions facing to each other in the radial direction in the eighth embodiment, and therefore, corresponding thereto, the two open edges among the four slits 831 of the outer tube member 830 are provided with the large-width portions 831a for making the protruded portions 821 escaped. In accordance with the ninth embodiment, however, the bent portion protruding inwardly of the fastening member 850 is provided in the single position, and hence the outer tube member 860 includes a large-width portion 861a provided in only one slit 861. Further, an axial length of the large-width portion 861a of the slit 861 is set larger than the large-width portion 831a of the tube slit in the eighth embodiment, corresponding to the axial width of the bent portion 851 of the fastening member 850. The widths $W_1$, $W_2$ of the slit 861 and of the large-width portion 361a thereof and the outer dimension $w_a$ (FIG. 24A) of the bent portion 851 of the fastening member 850 in the natural state where no external force is applied, are set to satisfy a relationship such as $W_1 < w_a < W_2$. The outside diameter $D_1$ of the outer tube member 860, the outside diameter $D_2$ of the annular groove 863 thereof and the inside diameter $d_1$ of the fastening member 850 in the natural state where no external force is applied, are set to satisfy a relationship such as $d_1 < D_2 < D_1$.

Figure 26A:
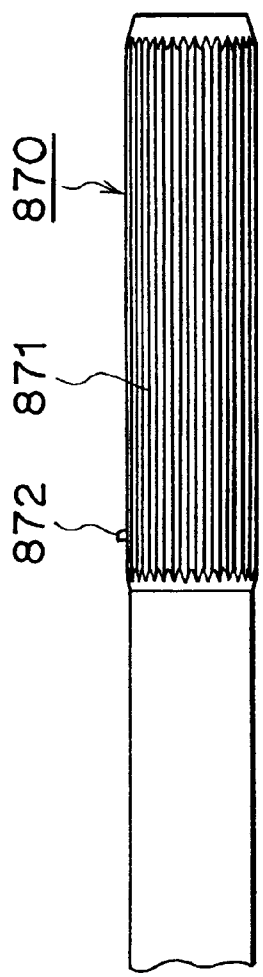
FIGS. 26A–26C are a front view, a side view and a plan view each showing an inner shaft member of the steering intermediate shaft in the eighth embodiment of the present invention.
Figure 26B:
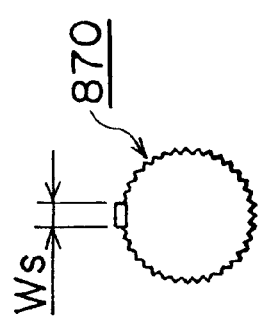
Figure 26C:
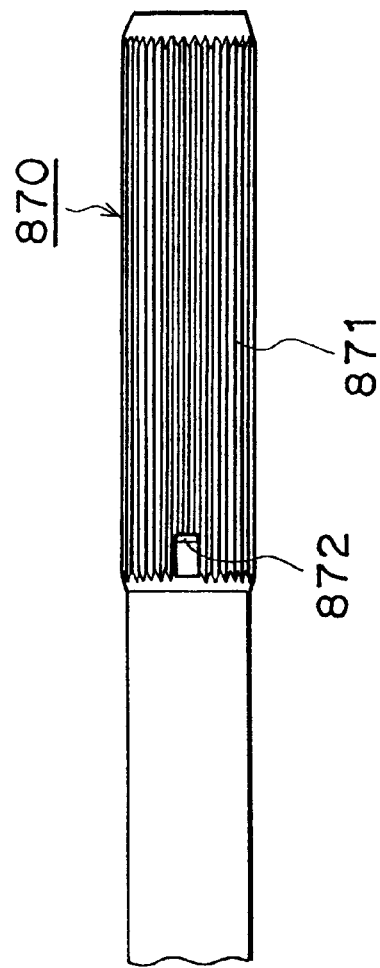

FIGS. 26A–26C are a front view, a side view and a plan view each showing an inner shaft member in the ninth embodiment. This inner shaft member 870 is substantially the same as the inner shaft member 840 in the eighth embodiment shown in FIGS. 20A–20C. The protrusions 842 of the inner shaft member 840 are, however, provided in the two positions facing to each other in the peripheral direction. By contrast, a protrusion 872 of the inner shaft member 870 is provided in only one position. It is because the protrusion serves to push a bent portion 851 of a fastening member 850, and the bent portion is provided in only one position. An outer periphery of the inner shaft member 870 is formed with a serration 871 so formed as to fit at a minute gap to a serration 862 of an outer tube member 860.

Next, a method of combining the members explained above will be described with reference to FIG. 27. To begin with, the inner shaft member 870 is fitted in the outer tube member 860. At this time, the serrations 871, 862 of the two components are fitted to each other at the minute gap, so that the shaft member 870 can be intruded into the outer tube member 860 by the small sliding force.

In this state, the bent portion 851 of the fastening member 850 is intruded into the width $W_1$ portion of the slit 861 including the large-width portion 861a. As described above, the outer dimension $w_a$ of the bent portion and the dimension of the slit width $W_1$ are set such as $W_1 < w_a$. Therefore, the bent portion 851 of the fastening member 850 is shrunk by pushing in such a direction that the outer dimension $w_a$ decreases, i.e., it follows that the fastening member 850 itself is expanded by pushing so that the inside diameter thereof increases. Accordingly, in this state, such a fastening force as to make the gap between the serrations of the outer tube member 860 and the inner shaft member 870 disappear, does not act, and the two components are still slidable on each other by the small force. Further, a peripheral width $w_s$ of the projection 872 of the inner shaft member 870 is set larger than an inner dimension $w_b$ of the bent portion 851 of the fastening member in this state ($w_b < w_s$).

Figure 27:
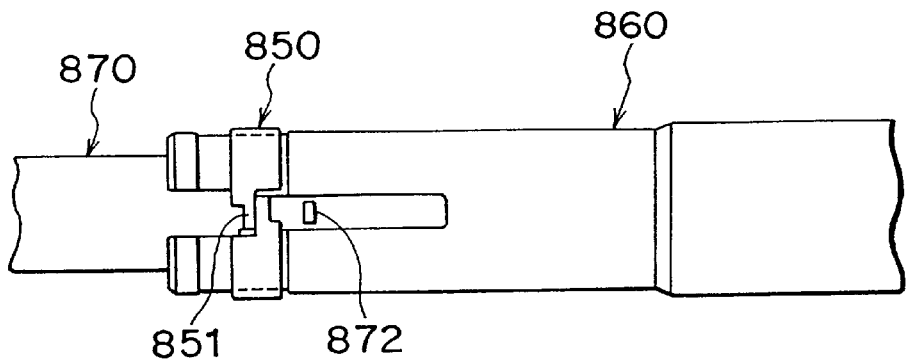
FIG. 27 is a view showing a state of combining the respective members of the steering intermediate shaft in the eighth embodiment of the present invention.

When fitting the yoke 807 into the input shaft 808 as in the eighth embodiment (Note that this process is easily known by analogical inference referring to FIGS. 21A–23, and therefore the illustrations of the yoke 807 and the input shaft 808 are omitted in FIG. 27), the inner shaft member 870 is pulled out of the outer tube member 860 by moving the member 870 leftward in FIG. 27, at which time the projection 872 moves leftward correspondingly and impinges at a certain point upon the bent portion 851 of the fastening member 850. When the inner shaft member 870 is moved further leftward, the projection 872 moves the bent portion 851 of the fastening member by pushing and thrusts it into the large-width portion 861a of the slit 861. A width $W_2$ of the large-width portion 861a is larger than the outer dimension $w_a$ of the bent portion 851 of the fastening member in the natural state, and hence the bent portion 851 escapes into the large-width portion 861a. Consequently, the bent portion 851 is expanded (namely, $w_a$ and $w_b$ increase), and the inside diameter of the fastening member diminishes enough to make the fastening force of the outer tube ember 860 act. That is, there disappears the gap between the serrations 862, 871 of the outer tube member 860 and the shaft member 870, and the backlash, which might be caused when transmitting the rotating force between these two components, also disappears.

In this state the dimensions are set so that the inner dimension $w_b$ of the bent portion 851 and the width $w_s$ of the projection 872 satisfy $w_s < w_b$. With this setting, when the shaft member 870 is pulled out of the outer tube member 860 and moved leftward, the projection 872 passes through the inner dimension $w_b$ portion of the bent portion and thus can exit on the left side.

Incidentally, the fastening member 850 has been exemplified by it being constructed of the flat plate of the elastic material but may involve the use of a wire spring.

As discussed above, in the eighth embodiment, the protruded portion 821 is fitted in the slit 831 to expand the outer tube member. Further, in the ninth embodiment, the bent portion 851 is fitted in the slit 861 to expand the inside diameter of the fastening member. With these arrangements, the sliding of the inner shaft member is facilitated by retraining the fastening force enough not to act, and the axial position is changed by moving the inner shaft member with respect to the outer tube member. Thereupon, at a certain point of time the protruded portion 821 or the bent portion 851 moves off out of the slit, with result that the fastening force of the fastening member does act. According to the constructions in the embodiments discussed above, there is no necessity for applying a special operation from the outside in order to change the fastening force, and there might suffice such an operation as to simply move the shaft member in the axial direction which is performed for assembling the ordinary steering mechanism. The operation is thus simple. In addition, it is unnecessary to have an access for the operation from the outside with respect to the fastening member etc, and hence it is feasible to fit a seal cover etc between the shaft member and the outer tube member.

Figure 28:
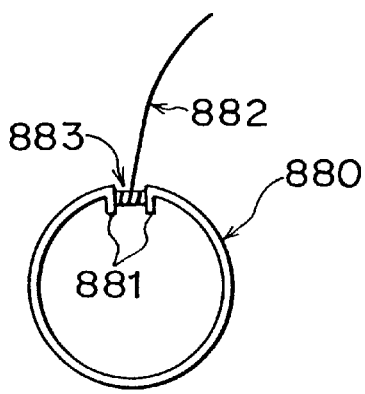
FIG. 28 is a view illustrating the fastening member attached with a spacer for simply carrying out a concept of the present invention.

In addition to the eighth and ninth embodiments described above, a simple method of temporarily eliminating the fastening force is shown in FIG. 28. Herein, in a state where a spacer 883 with a string is interposed between two edges 881 of an annular fastening member 880 in a state where the fastening member is expanded by pushing. In this state, the fastening member 880 is externally fitted to the outer tube member. Thereafter, the inner shaft member is pushed inside the outer tube member, and, in a state where the chassis and the body are assembled, the input shaft 808 and the yoke 807 are spaced away from each other in the axial direction. Thereafter, the inner shaft member is pulled out, and the yoke is fitted in the input shaft, after which the spacer 883 is pulled out by drawing a string 882, thereby causing the fastening force to act.

Note that the protruded portion 821 of the fastening member 820 is constructed by bending a part of the material composing the fastening member in the eighth embodiment. This protruded portion may be, however, any sort of protrusion on condition that it protrudes on the side of the inner periphery of the fastening member. For example, a different member may be fixed to the fastening member by welding etc.

Further, in the embodiment discussed above, the outer tube member engages with the inner shaft member through the serrations. The present invention is not, however, limited to this serration engagement and exhibits effects in other engaging modes such as a spline engagement through which the sliding in the axial direction can be done with a transmission of the force in the rotating direction.

In the embodiments discussed above, the outer tube member includes the four slits formed at the equal intervals in the peripheral direction. The number of the slits is not, however, limited to 4, and at least one slit may suffice.

In the intermediate shaft in the eighth and ninth embodiments, discussed above, of the present invention, the fastening force of the fastening member is variable corresponding to the axial position of the shaft member. With this arrangement, the yoke of the intermediate shaft member of the steering apparatus is attached to the input shaft of the steering gear, on which occasion the inner shaft member and the outer tube member slide on each other in the axial direction. Then, the operation is facilitated by reducing the sliding force therebetween, thereby making it possible to give the sufficient fastening force with no rotational backlash between the inner shaft member and the outer tube member after being assembled. Moreover, since the sliding force between the inner shaft member and the outer tube when in the assembly is small, it is feasible to prevent an inaccurate assembly such as a phase difference in the rotating direction between the yoke and the input shaft.

Further, the constructions as exemplified in the eighth and ninth embodiments can be attained simply by changing slightly a partial configuration of the slit of the outer tube member and a configuration of the fastening member, and the above effects can be obtained at low costs.

What is claimed is:

1. A steering column intermediate shaft assembly, comprising:

an inner shaft member having an end portion received by an end portion of an outer tube member, said end portions being engaged with each other so as to be capable of transmitting rotation and to be slidable relative to each other along a common axis thereof;

said end portion of said outer tube member including a plurality of slits open at an end of said outer tube member and extending along said axis; and a fastening device including a generally annular portion provided on said end portion of said outer tube member and exerting a radially inward force on said outer tube member at said slits to press said end portion of said outer tube member against said inner shaft member, and disengagement preventing means cooperating with said inner shaft member and said generally annular portion to prevent inadvertent escape of said inner shaft member from said outer tube member.

2. A steering column intermediate shaft assembly according to claim 1, wherein said disengagement preventing means comprises an arm connected to said generally annular portion and extending beyond said end of said outer tube member, and a tip of said arm engages with an outer surface portion of said inner shaft member to prevent the inadvertent escape of said inner shaft member from said outer tube member.

3. A steering column intermediate shaft assembly according to claim 1, wherein said disengagement preventing means includes an engaging member disposed in one of said slits for cooperation with an outer surface portion of said inner shaft member to prevent the inadvertent escape of said inner shaft member from a said outer tube member.

4. A steering column intermediate shaft assembly according to claim 1, wherein said disengagement preventing means includes a member mounted to said inner shaft member and having a portion disposed in one of said slits to engage said generally annular portion of said fastening device and thereby prevent the inadvertent escape of said inner shaft member from said outer tube.

5. A steering column intermediate shaft assembly according to claim 1, wherein said fastening device includes a spring member having a first coil portion disposed about said end portion of said outer tube member, a second coil portion disposed about a portion of said inner shaft member, and an arm portion connecting said first and second coil portions to each other.

6. A steering column intermediate shaft assembly according to claim 1, wherein said disengagement preventing means includes a generally annular member fitted about said inner shaft member and an arm member extending from said generally annular member into one of said slits, a portion of said arm member being disposed to engage said generally annular portion of said fastening device and thereby prevent the inadvertent escape of said inner shaft member from said outer tube.

7. A steering column intermediate shaft assembly, comprising:

an inner shaft member having an end portion received by an end portion of an outer tube member, said end portions being engaged with each other so as to be capable of transmitting rotation and to be slidable relative to each other along a common axis thereof;

said end portion of said outer tube member including a plurality of slits open at an end of said outer tube member and extending along said axis; and a fastening device including a generally annular first portion provided on said end portion of said outer tube member and exerting a radially inward force on said outer tube member at said slits to press said end portion of said outer tube member against said inner shaft member, and a second portion that cooperates with said inner shaft member and said first portion so as to prevent inadvertent escape of said inner shaft member from said outer tube member.

8. A steering column intermediate shaft assembly according to claim 7, wherein said second portion of said fastening device includes a member mounted to said inner shaft member and having a portion disposed in one of said slits to engage said first portion of said fastening device and thereby prevent the inadvertent escape of said inner shaft member from said outer tube.

9. A steering column intermediate shaft assembly according to claim 7, wherein said second portion of said fastening device comprises an arm connected to said first portion and extending beyond said end of said outer tube member, and a tip of said arm engages with an outer surface portion of said inner shaft member to prevent the inadvertent escape of said inner shaft member from said outer tube member.

10. A steering column intermediate shaft assembly according to claim 7, wherein said second portion of said fastening device includes an engaging member disposed in one of said slits for cooperation with an outer surface portion of said inner shaft member to prevent the inadvertent escape of said inner shaft member from said outer tube member.

11. A steering column intermediate shaft assembly according to claim 7, wherein said fastening device includes a spring member having a first coil portion disposed about said end portion of said outer tube member, a second coil portion disposed about a portion of said inner shaft member, and an arm portion connecting said first and second coil portions to each other.

12. A steering column intermediate shaft assembly according to claim 7, wherein said second portion of said fastening device includes a generally annular member fitted about said inner shaft member and an arm member extending from said generally annular member into one of said slits, a portion of said arm member being disposed to engage said first portion of said fastening device and thereby prevent the inadvertent escape of said inner shaft member from said outer tube.

13. A steering column intermediate shaft assembly, comprising:

an elongated inner shaft member;

an elongated outer tube member coaxial with said inner shaft member and having an end portion in which and end portion of said inner shaft member is received, said end portions being rotatable together and axially slidable relative to each other, said end portion of said outer tube member being formed with a plurality of elongated slits which are open at an end of said outer tube member;

a fastening member provided on said end portion of said outer tube member and exerting a radially inward force at said slits to press said end portion of said outer tube member on said end portion of said inner shaft member such that said end portions are axially slidable relative to each other without rotational backlash; and a disengagement preventing mechanism which prevents inadvertent escape of said inner shaft member from said outer tubular member.

14. A steering column intermediate shaft assembly according to claim 13, wherein said disengagement preventing mechanism includes a latching element provided on said inner shaft member, said latching element having a portion disposed to be brought into engagement with said fastening member when a force tending to cause said inner shaft member to escape from said outer tube member is applied to said shaft assembly, to thereby prevent such escape.

15. A steering column intermediate shaft assembly according to claim 13, wherein said disengagement preventing mechanism includes a stepped portion formed on said inner shaft member, and a latching element cooperating with said fastening member and disposed to be brought into contact with said stepped portion of said inner shaft member when a force tending to cause said inner shaft member to escape from said outer tube member is applied to said shaft assembly, to thereby prevent such escape.

16. A steering column intermediate shaft assembly according to claim 15, wherein said latching element is integrally formed with said fastening member.

\* \* \* \* \*